United States Patent
Hori et al.

(10) Patent No.: US 9,813,674 B2
(45) Date of Patent: Nov. 7, 2017

(54) PHOTOGRAPHY SYSTEM AND PHOTOGRAPHY METHOD

(71) Applicant: OLYMPUS CORPORATION, Tokyo (JP)

(72) Inventors: Fumio Hori, Tokyo (JP); Eiichi Kobayashi, Tokyo (JP); Yutaka Konomura, Tokyo (JP)

(73) Assignee: OLYMPUS CORPORATION, Tokyo (JP)

(*) Notice: Subject to any disclaimer, the term of this patent is extended or adjusted under 35 U.S.C. 154(b) by 143 days.

(21) Appl. No.: 14/196,344

(22) Filed: Mar. 4, 2014

(65) Prior Publication Data

US 2014/0253715 A1    Sep. 11, 2014

Related U.S. Application Data

(60) Provisional application No. 61/775,512, filed on Mar. 9, 2013.

(51) Int. Cl.
*H04N 7/18* (2006.01)
*G06T 7/00* (2017.01)
(Continued)

(52) U.S. Cl.
CPC ............ *H04N 7/18* (2013.01); *F01D 21/003* (2013.01); *G02B 23/2476* (2013.01);
(Continued)

(58) Field of Classification Search
CPC .. G06T 7/0008; G02B 23/2476; F01D 21/003
(Continued)

(56) References Cited

U.S. PATENT DOCUMENTS

2005/0199832 A1*  9/2005  Twerdochlib ........... F01D 5/005
                                                                  250/559.29
2006/0178558 A1    8/2006  Obata
(Continued)

FOREIGN PATENT DOCUMENTS

EP    2 284 797 A1   2/2011
EP    2 597 273 A2   5/2013
GB       2493770 A   2/2013

OTHER PUBLICATIONS

Extended European Search Report dated Oct. 16, 2014 from related European Application No. 14 15 7864.1.
(Continued)

*Primary Examiner* — Gims Philippe
*Assistant Examiner* — Mainul Hasan
(74) *Attorney, Agent, or Firm* — Scully, Scott, Murphy & Presser, P.C.

(57) ABSTRACT

A photography system includes: an observation scope inserted into a hole of a case in which a plurality of sets of subject groups, each of which includes a plurality of subjects that are cyclically disposed around a rotary shaft and rotate around the rotary shaft, are housed along with the rotary shaft and a plurality of holes are formed to penetrate through the case and configured to sequentially acquire light from the plurality of subjects included in one set of subject groups among the plurality of sets of subject groups; an imaging section configured to continuously image light acquired by the observation scope to generate an image in a state in which the plurality of sets of subject groups rotate; and a display section configured to display the image generated by the imaging section.

9 Claims, 34 Drawing Sheets

(51) Int. Cl.
*G02B 23/24* (2006.01)
*F01D 21/00* (2006.01)

(52) U.S. Cl.
CPC ........ *G06T 7/0008* (2013.01); *F05D 2270/11* (2013.01); *F05D 2270/8041* (2013.01)

(58) Field of Classification Search
USPC .......................................................... 348/82
See application file for complete search history.

(56) References Cited

U.S. PATENT DOCUMENTS

| | | | |
|---|---|---|---|
| 2010/0275574 A1* | 11/2010 | Salunkhe | F01D 21/003 60/39.091 |
| 2011/0025844 A1 | 2/2011 | Hori | |
| 2011/0262026 A1 | 10/2011 | Hori | |
| 2012/0044349 A1* | 2/2012 | Hori | H04N 7/183 348/136 |
| 2013/0113913 A1* | 5/2013 | Scheid | G01N 21/8851 348/82 |
| 2013/0135457 A1* | 5/2013 | Kell | F01D 25/285 348/82 |

OTHER PUBLICATIONS

Partial European Search Report dated Jun. 17, 2014 from related European Application No. 14 15 7864.1.

\* cited by examiner

PHOTOGRAPHY SYSTEM AND PHOTOGRAPHY METHOD

Priority is claimed on U.S. Provisional Patent Application No. 61/775,512, filed Mar. 9, 2013, the content of which is incorporated herein by reference.

BACKGROUND OF THE INVENTION

Field of the Invention

The present invention relates to technology for imaging a plurality of subjects which are cyclically disposed around a rotary shaft and rotate around the rotary shaft.

Description of the Related Art

In the related art, blades within a jet engine, etc. are observed using an observation scope of an endoscope, etc. Using an image of a subject (an object to be tested) acquired using the observation scope, for example, it is possible to determine the presence/absence of a defect on the subject or measure a size of the defect.

SUMMARY

According to a first aspect of the present invention, a photography system includes: an observation scope inserted into a hole of a case in which a plurality of sets of subject groups, each of which includes a plurality of subjects that are cyclically disposed around a rotary shaft and rotate around the rotary shaft, are housed along with the rotary shaft and a plurality of holes are formed to penetrate through the case and configured to sequentially acquire light from the plurality of subjects included in one set of subject groups among the plurality of sets of subject groups; an imaging section configured to continuously image light acquired by the observation scope to generate an image in a state in which the plurality of sets of subject groups rotate; and a display section configured to display the image generated by the imaging section, wherein a plurality of observation scopes are inserted into the plurality of holes in correspondence with the plurality of sets of subject groups, the imaging section simultaneously images light acquired by the plurality of observation scopes to generate a plurality of images corresponding to the plurality of sets of subject groups, and the display section simultaneously displays the plurality of images.

According to a second aspect of the present invention, the photography system according to the first aspect may further include: an image processing section configured to process an image generated by the imaging section, wherein a position of a shaft direction of the rotary shaft for each of the plurality of sets of subject groups is different and an angle between a predetermined direction based on the rotary shaft and a direction for each of the plurality of holes is different when viewed in the shaft direction of the rotary shaft, the image processing section corrects a display position of each image when the plurality of images are arranged and displayed in a direction different from a direction in which the plurality of subjects are arranged within the plurality of images based on the angle of each of the plurality of holes, and the display section arranges and displays the plurality of images processed by the image processing section.

According to a third aspect of the present invention, in the photography system according to the second aspect, the image processing section may correct the display position so that a position of an image corresponding to the same position in a circumferential direction of the rotary shaft is aligned when viewed in the shaft direction of the rotary shaft.

According to a fourth aspect of the present invention, in the photography system according to the third aspect, the image processing section may correct the display position by relatively shifting another image in the direction in which the plurality of subjects are arranged within an image with respect to one image of the plurality of images.

According to a fifth aspect of the present invention, in the photography system according to the third aspect, the image processing section may clip a partial image including one end part of any one of the plurality of images by an amount based on the angle and combines the clipped partial image with another end part.

According to a sixth aspect of the present invention, a photography system includes: an observation scope inserted into a hole of a case in which a plurality of subjects, which are cyclically disposed around a rotary shaft and rotate around the rotary shaft, are housed along with the rotary shaft and the hole is formed to penetrate through the case and configured to sequentially acquire light from the plurality of subjects; a fixing section configured to fix the same observation scope at a plurality of positions, each of which has a different distance from the rotary shaft; an imaging section configured to perform an operation of generating an image by continuously imaging light acquired by the observation scope in a state in which the plurality of subjects rotate in a state in which the same observation scope is fixed at each of the plurality of positions; and a display section configured to arrange and display an image corresponding to each of the plurality of positions so that a position of the same subject imaged to extend over each image is aligned.

According to a seventh aspect of the present invention, the photography system according to the sixth aspect may further include: an image processing section configured to generate the image corresponding to each of the plurality of positions by extracting an image based on a position imaged at a timing based on a rotation cycle of the rotary shaft from the image generated by the imaging section.

According to an eighth aspect of the present invention, a photography system includes: an observation scope inserted into a hole of a case in which a plurality of subjects, which are cyclically disposed around a rotary shaft and rotate around the rotary shaft, are housed along with the rotary shaft and the hole is formed to penetrate through the case and configured to sequentially acquire light from the plurality of subjects; an imaging section configured to generate an image by continuously imaging light acquired by the observation scope in a state in which the plurality of subjects rotate; an image processing section configured to detect the subject from the image generated by the imaging section and generate an image including a predetermined number of subjects; and a display section configured to display the image processed by the image processing section.

According to a ninth aspect of the present invention, in the photography system according to the eighth aspect, the image processing section may detect the subject based on variation in a line direction of a plurality of pixel values on a predetermined line set in the image generated by the imaging section and generates an image including a predetermined number of subjects from the image generated by the imaging section.

According to a tenth aspect of the present invention, in the photography system according to the eighth aspect, the image processing section may perform a process of reducing irregularity of rotation of the rotary shaft on the generated image.

According to an eleventh aspect of the present invention, in the photography system according to the tenth aspect, the image processing section may perform a process of correcting a width and a position of the subject in a direction in which the subject is arranged within the image on the generated image.

According to a twelfth aspect of the present invention, a photography system includes: an observation scope inserted into a hole of a case in which a plurality of sets of subject groups, each of which includes a plurality of subjects that are cyclically disposed around a rotary shaft and rotate around the rotary shaft, are housed along with the rotary shaft and a plurality of holes are formed to penetrate through the case and configured to sequentially acquire light from the plurality of subjects included in one set of subject groups of one set among the plurality of sets of subject groups; and a line sensor configured to generate an image by continuously imaging light acquired by the observation scope in a state in which the plurality of sets of subject groups rotate, wherein a plurality of observation scopes are provided in correspondence with the plurality of sets of subject groups, and the line sensor generates a plurality of images by simultaneously imaging light acquired by the plurality of observation scopes.

According to a thirteenth aspect of the present invention, a photography method includes: rotating a rotary shaft in a case in which a plurality of sets of subject groups, each of which includes a plurality of subjects that are cyclically disposed around the rotary shaft and rotate around the rotary shaft, are housed along with the rotary shaft and a plurality of holes are formed to penetrate through the case; inserting a plurality of observation scopes, each of which sequentially acquires light from the plurality of subjects included in one set of subject groups among the plurality of sets of subject groups, into the holes in correspondence with the plurality of sets of subject groups; simultaneously continuously imaging light by the plurality of observation scopes in a state in which the plurality of sets of subject groups rotate and generating a plurality of images corresponding to the plurality of sets of subject groups; and simultaneously displaying the plurality of images.

DETAILED DESCRIPTION OF THE PREFERRED EMBODIMENTS

Hereinafter, embodiments of the present invention will be described with reference to the drawings.

First Embodiment

Figure 1:
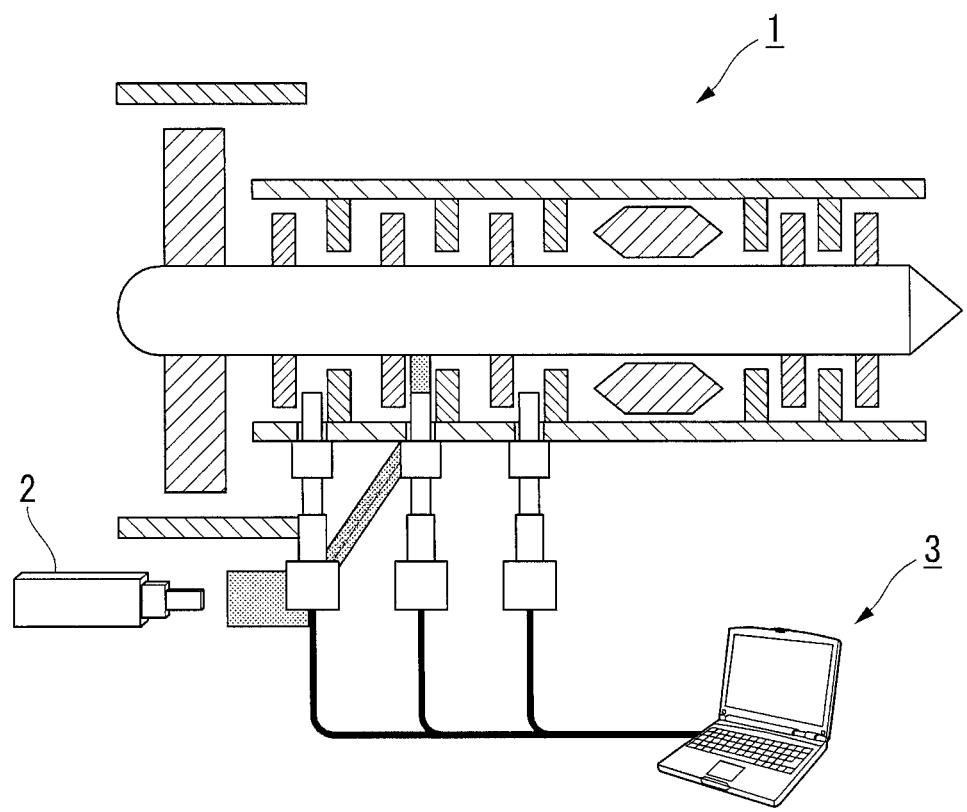
FIG. 1 is a diagram illustrating a configuration of a blade observation system according to a first embodiment of the present invention.

First, the first embodiment of the present invention will be described. FIG. 1 illustrates a configuration of a blade observation system according to this embodiment. As illustrated in FIG. 1, the blade observation system has a jet engine 1, a turning tool 2, and a photography system 3. The jet engine 1 has a plate-like blade which is a subject to be photographed (an object to be tested). The turning tool 2 causes blades within the jet engine 1 to rotate. The photography system 3 photographs the blades to generate an image.

Figure 2:
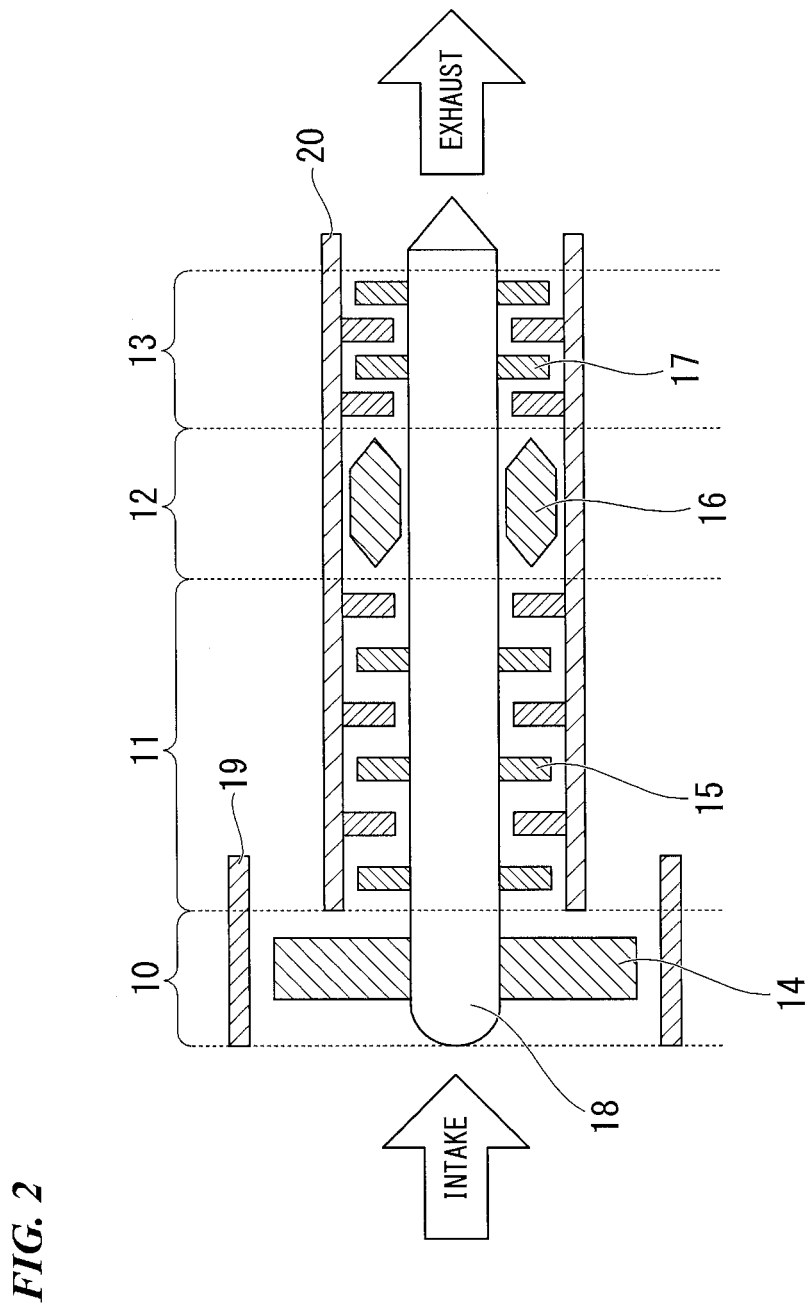
FIG. 2 is a diagram illustrating a cross-sectional structure of a jet engine in the first embodiment of the present invention.

FIG. 2 illustrates a cross-sectional structure of the jet engine 1. The jet engine 1 is a cylindrical structure, and is divided into an intake section 10, a compressor section 11, a combustion section 12, and an exhaust section 13 from an intake side (the left of FIG. 2) to an exhaust side (the right of FIG. 2). In the intake section 10, a fan blade 14 rotates to suction the air from outside to the inside of the jet engine 1. In the compressor section 11, compressor blades 15 rotate and the suctioned air is compressed. In the combustion section 12, the compressed air is combusted by a fuel introduced into a combustion tube 16. In the exhaust section 13, turbine blades 17 rotate and therefore the combusted air is exhausted to the outside.

The fan blades 14, the compressor blades 15, and the turbine blades 17 are disposed around the same rotary shaft 18 which is on the center of the jet engine 1 and rotates around the rotary shaft 18. The fan blades 14, the compressor blades 15, the combustion tubes 16, the turbine blades 17, and the rotary shaft 18 are housed in casings 19 and 20 which are housing containers (cases).

Figure 3A:
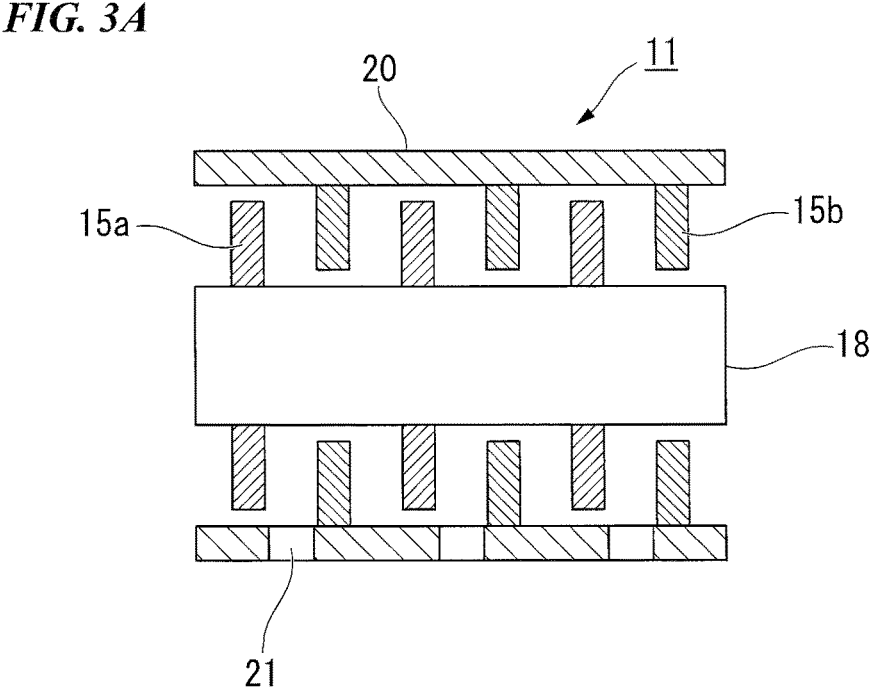
FIG. 3A is a diagram illustrating a cross-sectional structure of a compressor section in the first embodiment of the present invention.
Figure 3B:
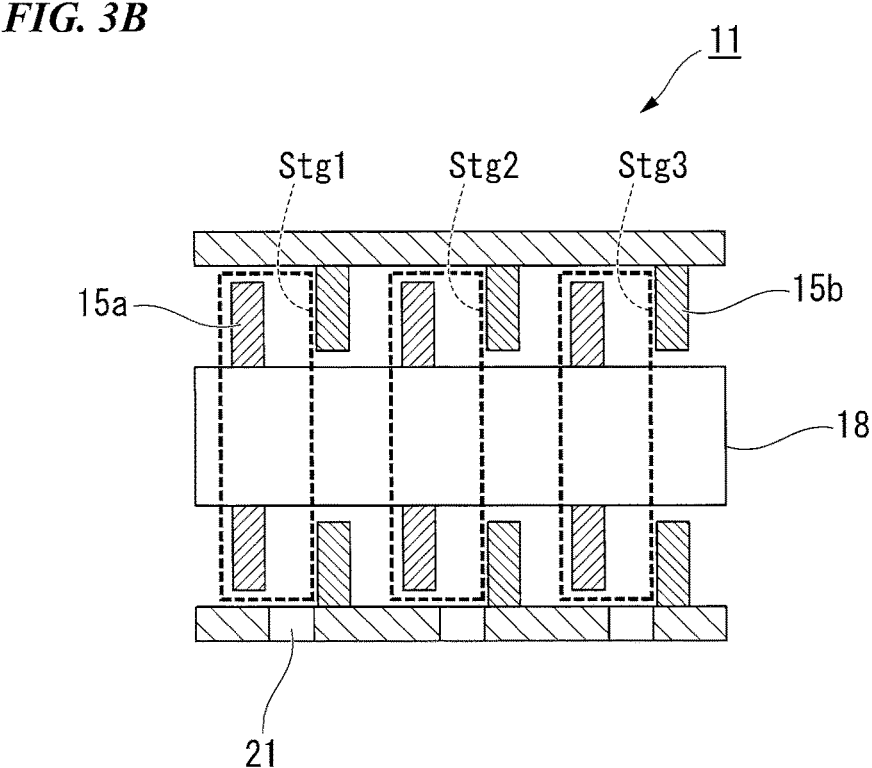
FIG. 3B is a diagram illustrating a cross-sectional structure of the compressor section in the first embodiment of the present invention.

Each of FIGS. 3A and 3B illustrates a cross-sectional structure of the compressor section 11. There are two types of the compressor blades 15, including a rotor 15a and a stator 15b. The rotor 15a is a blade which is cyclically disposed around the rotary shaft 18 and rotates according to rotation of the rotary shaft 18. The stator 15b is fixed to the casing 20 and is a stationary blade. In this embodiment, the rotor 15a is a subject to be photographed and the stator 15b is not a subject to be photographed. Hereinafter, the rotor 15a is merely described as the blade.

In the compressor section 11, a hole called an access port 21 penetrating through the casing 20 is opened in the casing 20. As will be described later, an observation borescope can be inserted from the outside into the access port 21 and an internal state of the jet engine 1 can be observed.

In the compressor section 11, a plurality of sets of blade groups are disposed at different positions of a shaft direction of the rotary shaft 18, wherein one set of blade groups (subject groups) includes a plurality of blades (rotors 15a) for one round cyclically disposed in a circumferential direction of the rotary shaft 18. In this embodiment, a range in which one set of blade groups is disposed is referred to as a stage. As illustrated in FIG. 3B, three stages Stg1, Stg2, and Stg3 are provided, and the stages are demarcated by the stators 15b. One access port 21 is provided for each stage. Light from the blades of each stage is acquired by the borescope inserted into the access port 21 corresponding to each stage. Although three stages are provided on the compressor section 11 of this embodiment, it is only necessary for the number of stages to be two or more.

Figure 4:
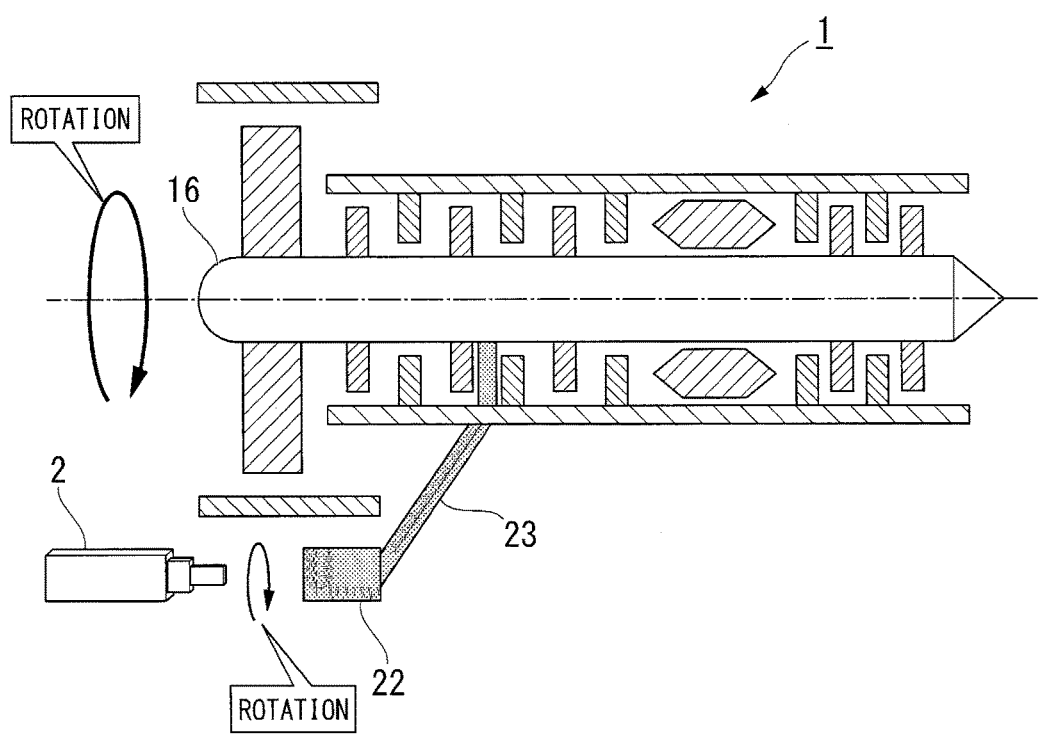
FIG. 4 is a diagram illustrating a configuration in which a rotary shaft of the jet engine rotates in the first embodiment of the present invention.

FIG. 4 illustrates a configuration in which the rotary shaft 18 is caused to rotate. Under the jet engine 1, a gear box 22 which is a mechanism for transferring a rotating force to the rotary shaft 18 is attached. When the blades are caused to rotate, the turning tool 2 is connected to the gear box 22 and the turning tool 2 rotates, so that the generated rotating force is applied to the gear box 22. The gear box 22 is connected to a shaft 23, the rotating force applied to the gear box 22 is applied to the rotary shaft 18 via the shaft 23, and the rotary shaft 18 rotates, so that the blades rotate.

Figure 5:
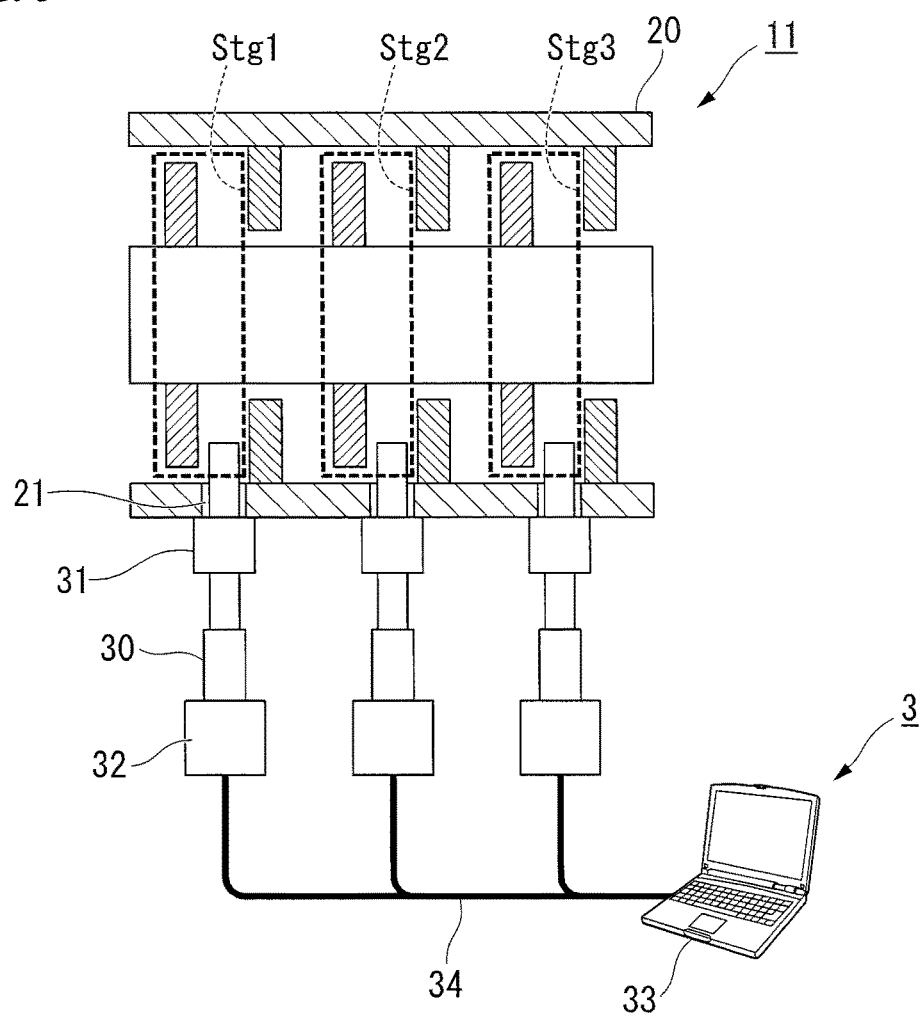
FIG. 5 is a diagram illustrating a configuration of a photography system in the first embodiment of the present invention.

FIG. 5 illustrates a configuration of the photography system 3. The photography system 3 is a system for efficiently photographing blades which are a subject, and is an example of a photography system which is an aspect of the present invention. The photography system 3 has borescopes 30, fixing tools 31, cameras 32, a PC 33, and a communication cable 34.

Three borescopes 30 and three fixing tools 31 are provided to be equal in number to the three stages Stg1, Stg2, and Stg3. The borescope 30 sequentially acquires light from a plurality of blades disposed on one stage. The borescope 30 is inserted from the access port 21 to the inside of the jet engine 1 (the inside of the casing 20). The borescope 30 is inserted to be approximately perpendicular to the surface of the casing 20. The borescope 30 is an example of the observation scope in the photography system which is an aspect of the present invention.

The fixing tool 31 is attached to the access port 21, and fixes the borescope 30 to the casing 20 in a state in which the borescope 30 is inserted inside the jet engine 1. The fixing tool 31 has a mechanism for moving the borescope 30 in a direction of insertion into the jet engine 1 and a direction of withdrawal from the jet engine 1 according to step movement in a state in which the borescope 30 is held. The user can hold the borescope 30 with a hand to push the borescope 30 into the jet engine 1 or can draw out the borescope 30 from the jet engine 1. The fixing tool 31 is an example of a fixing section in the photography system which is an aspect of the present invention.

The camera 32 is installed on an eyepiece section of the borescope 30. The camera 32 has a line sensor, continuously images light acquired by the borescope 30 in a state in which the blade rotates, and generates a blade image. The camera 32 accumulates the generated image in an internal frame memory, and sequentially outputs the accumulated image as a frame image at a timing based on a predetermined frame cycle. The camera 32 is an example of an imaging section and a line sensor in the photography system which is an aspect of the present invention.

The camera 32 is connected to the PC 33 using a communication cable 34. The image generated by the camera 32 is received by the PC 33. Photography software is installed in the PC 33. The photography software is software for controlling the cameras 32 and generating and displaying a map image to be described later after images generated by the cameras 32 are received by the PC 33. An operation of the photography software will be described later.

Although a blade image is acquired using the line sensor in which pixels are arranged in a one-dimensional direction in this embodiment, the blade image may be acquired using an area sensor in which pixels are arranged in a two-dimensional direction. In addition, although the blades are photographed by the cameras 32 disposed outside the jet engine 1 in this embodiment, the borescope on which an image sensor such as the line sensor or the area sensor is disposed may be used and the blades may be photographed in a state in which the image sensor is inserted inside the jet engine 1 using the borescope. In addition, although the user moves the borescope 30 with his or her hand in this embodiment, the fixing tool 31 may have a mechanism for automatically moving the borescope 30.

When the borescope 30 moves according to step movement, a movement distance for each step may not be constant. In addition, the direction in which the borescope 30 moves according to the step movement may be arbitrarily selected from a direction of insertion into the jet engine 1 and a direction of withdrawal from the jet engine 1. In addition, although the borescope 30 is described as the observation scope as an example in this embodiment, for example, a tool for inserting the line sensor into the access port 21 is also included as the observation scope.

Figure 6:
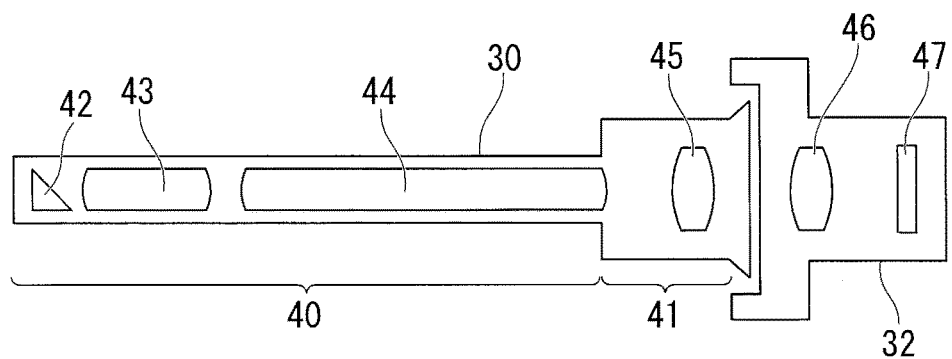
FIG. 6 is a diagram illustrating a cross-sectional structure of a borescope and a camera in the first embodiment of the present invention.

FIG. 6 illustrates a cross-sectional structure of the borescope 30 and the camera 32. The borescope 30 has a thin and long rigid insertion section 40 which is inserted into the jet engine 1 and a support section 41 which is positioned outside the jet engine 1 in use to support the insertion section 40.

An optical system for photographing the blades is disposed within the borescope 30. A mirror 42, an objective optical system 43, and a relay optical system 44 are disposed in the insertion section 40 as the optical system. The mirror 42 is disposed on a tip end of the insertion section 40, and guides light incident from the side surface of the borescope 30 to the insertion section 40 in the direction of the support section 41. The objective optical system 43 is disposed on a tip end side of the borescope 30 to form a real image of the blades. The relay optical system 44 transmits an image formed by the objective optical system 43 to the support section 41. An ocular optical system 45 configured to visualize the image transmitted by the relay optical system 44 is disposed on the support section 41. Although the borescope 30 has an illuminator in addition to the above, the illuminator is omitted in FIG. 6.

An imaging optical system 46 configured to form the image transmitted by the borescope 30 and a solid-state imaging element 47 (line sensor) configured to capture the blade image formed by the imaging optical system 46 are disposed in the camera 32.

Figure 7:
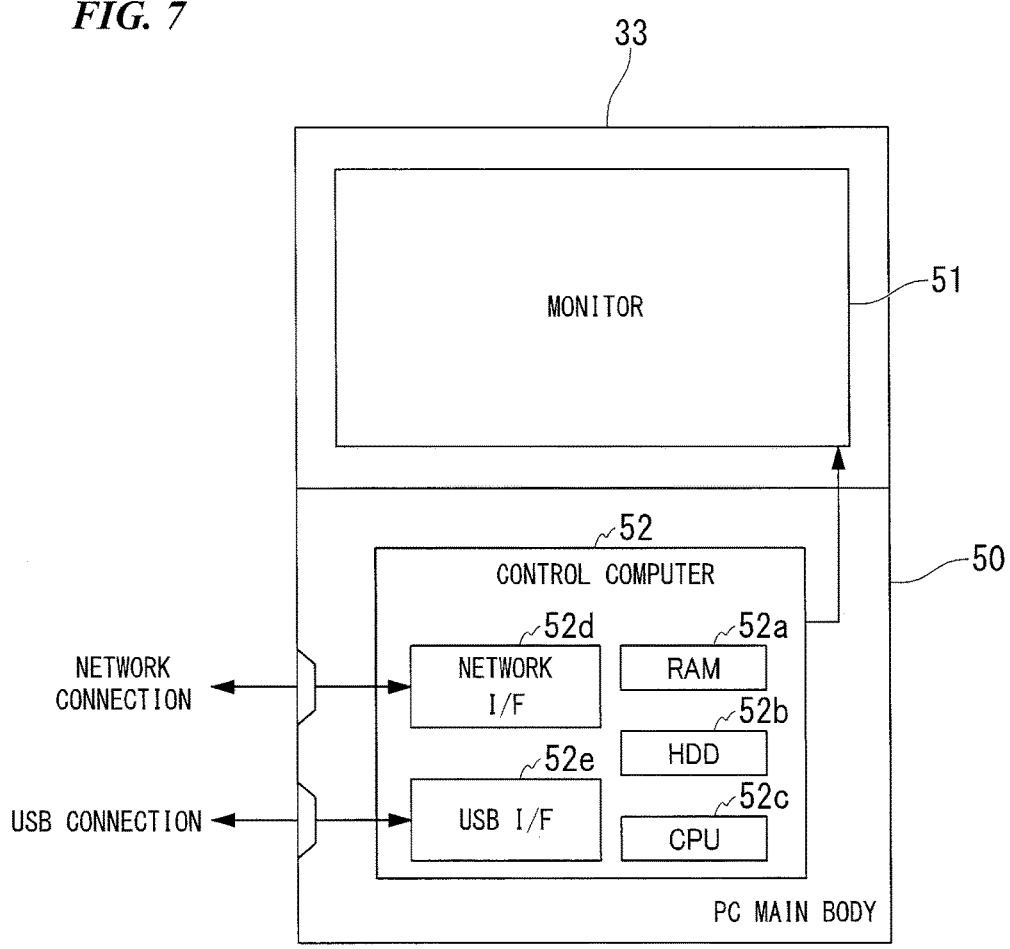
FIG. 7 is a block diagram illustrating a configuration of a personal computer (PC) in the first embodiment of the present invention.

FIG. 7 illustrates a configuration of the PC 33. The PC 33 has a PC main body 50 and a monitor 51. In the PC main body 50, a control computer 52 is embedded. The control computer 52 has a random access memory (RAM) 52*a*, a hard disk drive (HDD) 52*b*, a central processing unit (CPU) 52*c*, and a network interface (I/F) 52*d* and a Universal Serial Bus (USB) I/F 52*e* serving as external I/Fs. The control computer 52 is connected to the monitor 51, and the blade image, the screen of the photography software, etc. are displayed on the monitor 51. The monitor 51 is an example of a display section in the photography system which is an aspect of the present invention.

The RAM 52*a* is used to temporarily store data such as image information necessary for a software operation. The photography software is stored in the HDD 52*b*. In addition, in this embodiment, a frame image acquired from the camera 32 is saved inside the HDD 52*b*. According to a command code of the photography software stored in the HDD 52*b*, the CPU 52*c* executes an arithmetic operation for various control using the data stored in the RAM 52*a*. The CPU 52*c* is an example of an image processing section in the photography system which is an aspect of the present invention.

The network I/F 52*d* is an I/F for connecting the PC 33 to the camera 32 using the communication cable 34, and can input the frame image output from the camera 32 to the PC 33. The USB I/F 52*e* is an I/F for connecting the PC 33 to an external device. Although not illustrated in FIG. 7, the PC main body 50 has a user I/F for allowing the user to input various information.

Next, a photography area which is a range in which the camera 32 photographs the blades will be described. In general, because an observation field of the borescope is not wide, the overall blade may not be photographed in one photography operation according to a blade size. In this embodiment, for each range in which photography is possible in one photography operation, the blade is divided into a plurality of areas in a radial direction of rotation and each area is defined as a photography area. Among light acquired by the borescope 30, light within a photography area is imaged by the camera 32.

Figure 8A:
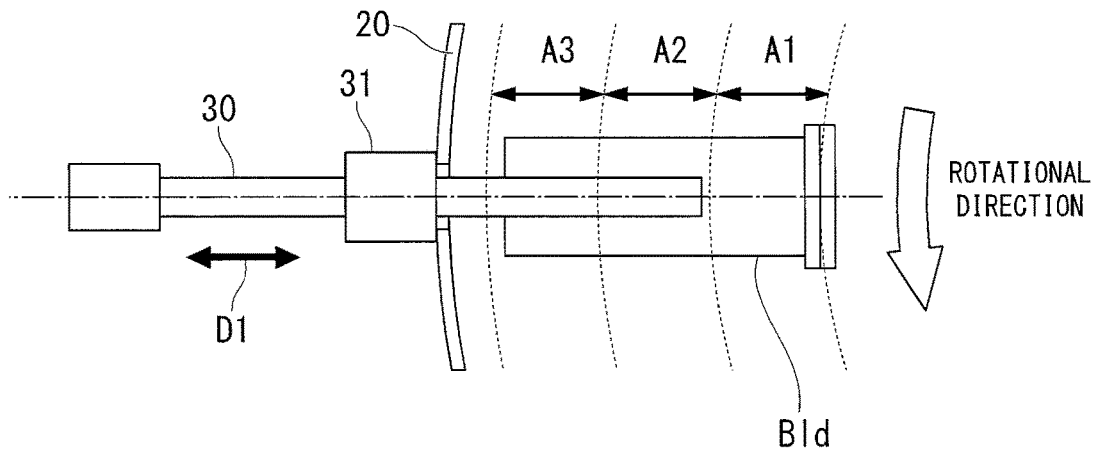
FIG. 8A is a diagram illustrating a photography area in the first embodiment of the present invention.
Figure 8B:
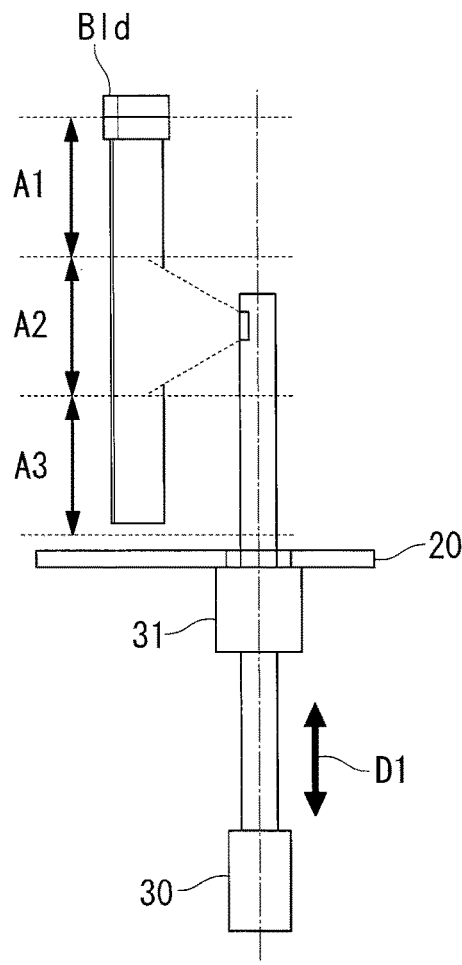
FIG. 8B is a diagram illustrating a photography area in the first embodiment of the present invention.

Each of FIGS. 8A and 8B illustrates the photography area. FIG. 8A illustrates the photography area when the borescope 30 is viewed in a shaft direction of the rotary shaft 18. FIG. 8B illustrates the photography area when the borescope 30 is viewed in a direction perpendicular to the shaft direction of the rotary shaft 18. As illustrated in FIGS. 8A and 8B, three photography areas A1, A2, and A3 are provided to cover the overall surface of the blade Bld in this embodiment. The borescope 30 moves in a direction D1 (a direction in which the borescope 30 is inserted into the jet engine 1 or a direction in which the borescope 30 is withdrawn from the jet engine 1), and therefore an image of each photography area is acquired.

Figure 9A:
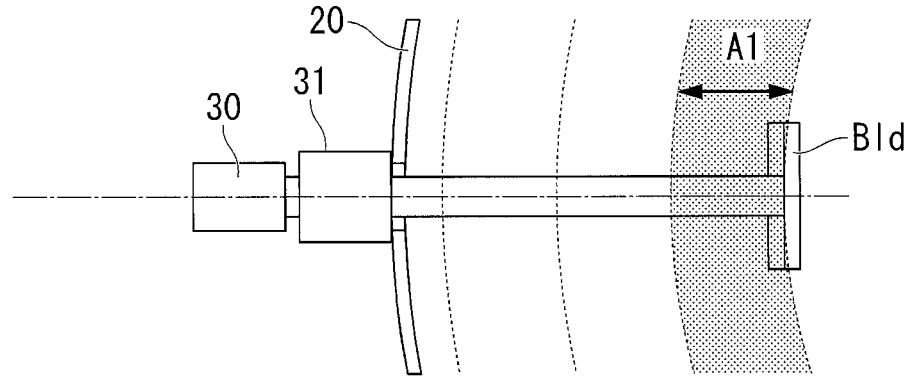
FIG. 9A is a diagram illustrating a layout position of the borescope in the first embodiment of the present invention.
Figure 9B:
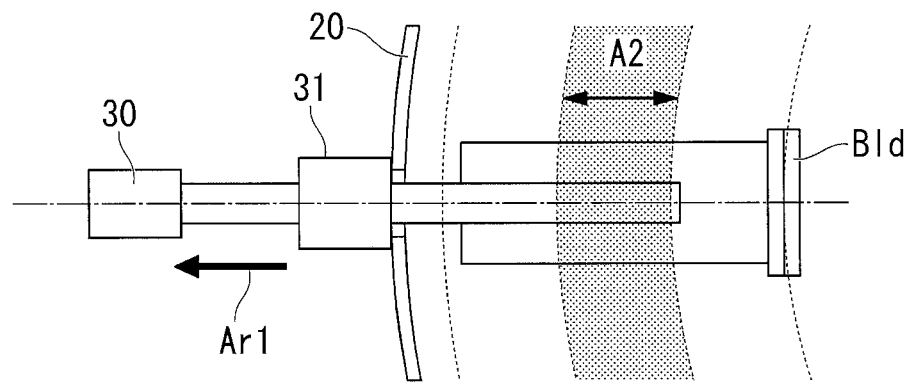
FIG. 9B is a diagram illustrating a layout position of the borescope in the first embodiment of the present invention.
Figure 9C:
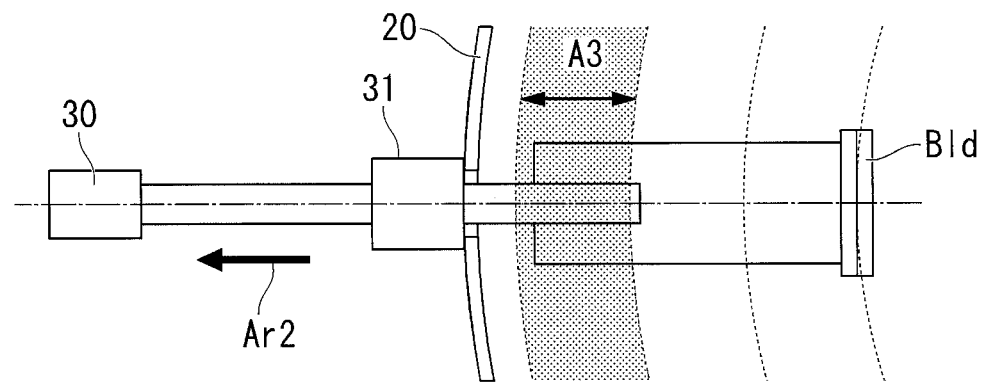
FIG. 9C is a diagram illustrating a layout position of the borescope in the first embodiment of the present invention.

Each of FIGS. 9A, 9B, and 9C illustrates a layout position of the borescope 30 during photography. The photography is performed while the borescope 30 moves from a side close to the rotary shaft 18 to a side away from the rotary shaft 18. FIG. 9A illustrates a layout position of the borescope 30 in first photography. The borescope 30 is fixed to a position at which light from the photography area A1 is received. FIG. 9B illustrates a layout position of the borescope 30 in second photography. After the first photography has been performed, the borescope 30 moves in a direction of an arrow Ar1, and the borescope 30 is fixed to a position at which light from the photography area A2 is received. FIG. 9C illustrates a layout position of the borescope 30 in third photography. After the second photography has been performed, the borescope 30 moves in a direction of an arrow Ar2, and the borescope 30 is fixed to a position at which light from the photography area A3 is received. In this manner, the borescope 30 is sequentially fixed to three positions having different distances from the rotary shaft 18.

Figure 10:
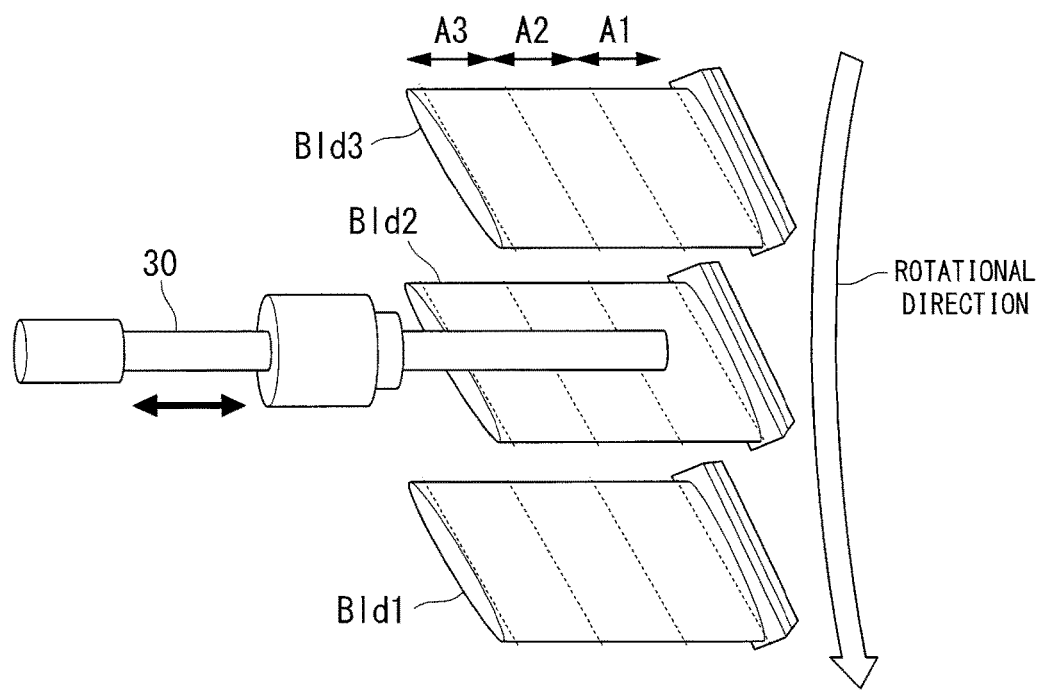
FIG. 10 is a diagram illustrating a layout position of the borescope in the first embodiment of the present invention.

FIG. 10 illustrates a layout position of the borescope 30 for a rotating blade. In FIG. 10, three blades Bld1, Bld2, and Bld3 among blades for one round disposed around the rotary shaft 18 are illustrated. The blades Bld1, Bld2, and Bld3 rotate in a downward direction in a rotational direction in the drawings. The borescope 30 is disposed on an upstream or downstream side of the blade when viewed in the shaft direction of the rotary shaft 18.

The borescope 30 in the first photography is fixed to the position illustrated in FIG. 9A and sequentially acquires light from the photography area A1 of the blade Bld1, the photography area A1 of the blade Bld2, and the photography area A1 of the blade Bld3. The borescope 30 in the second photography is fixed to the position illustrated in FIG. 9B and sequentially acquires light from the photography area A2 of the blade Bld1, the photography area A2 of the blade Bld2, and the photography area A2 of the blade Bld3. The borescope 30 in the third photography is fixed to the position illustrated in FIG. 9C and sequentially acquires light from the photography area A3 of the blade Bld1, the photography area A3 of the blade Bld2, and the photography area A3 of the blade Bld3.

Figure 11A:
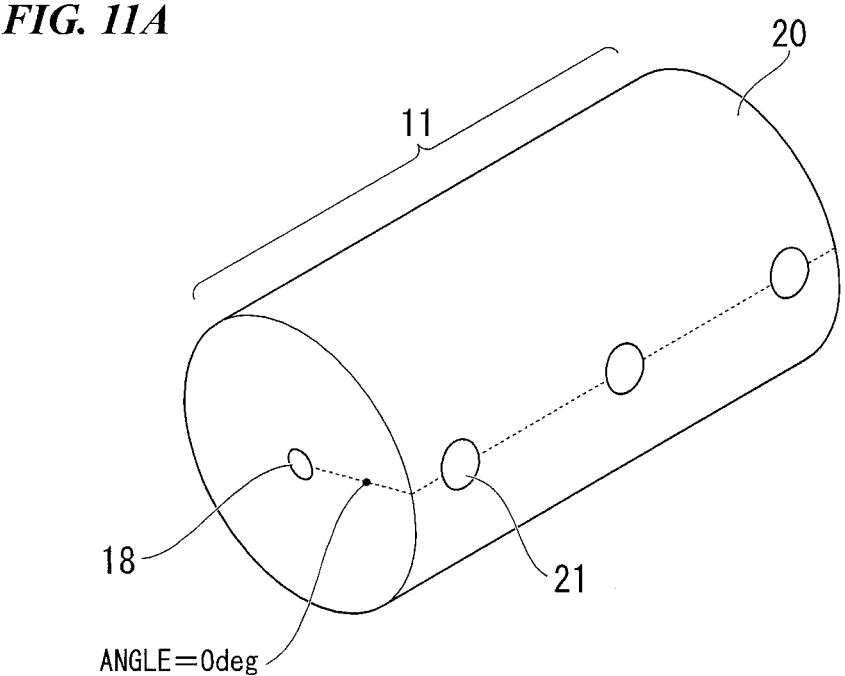
FIG. 11A is a perspective view illustrating an external appearance of the compressor section in the first embodiment of the present invention.

Next, a layout position of the access port in the jet engine 1 will be described. FIG. 11A schematically illustrates an external appearance of the compressor section 11. In FIG. 11A, a state of the surface of the casing 20 and a state in which the cross section of the casing 20 is viewed by penetrating through the intake section 10 are illustrated. The position of the access port 21 in the casing 20 is represented as an angle in the circumferential direction of the rotary shaft 18. When viewed in the shaft direction of the rotary shaft 18, a predetermined direction (a horizontal direction in FIG. 11A) passing through the center position of the rotary shaft 18 is a reference of the angle. An angle between the predetermined direction and a direction from the center position of the rotary shaft 18 to the access port 21 is an angle in the circumferential direction of the rotary shaft 18. In other words, on a plane perpendicular to the rotary shaft 18 at a position of the access port 21, an angle between a straight line extending in a predetermined direction from the center position of the rotary shaft 18 and a straight line extending from the center position of the rotary shaft 18 to a direction of the access port 21 is an angle in the circumferential direction of the rotary shaft 18.

Figure 11B:
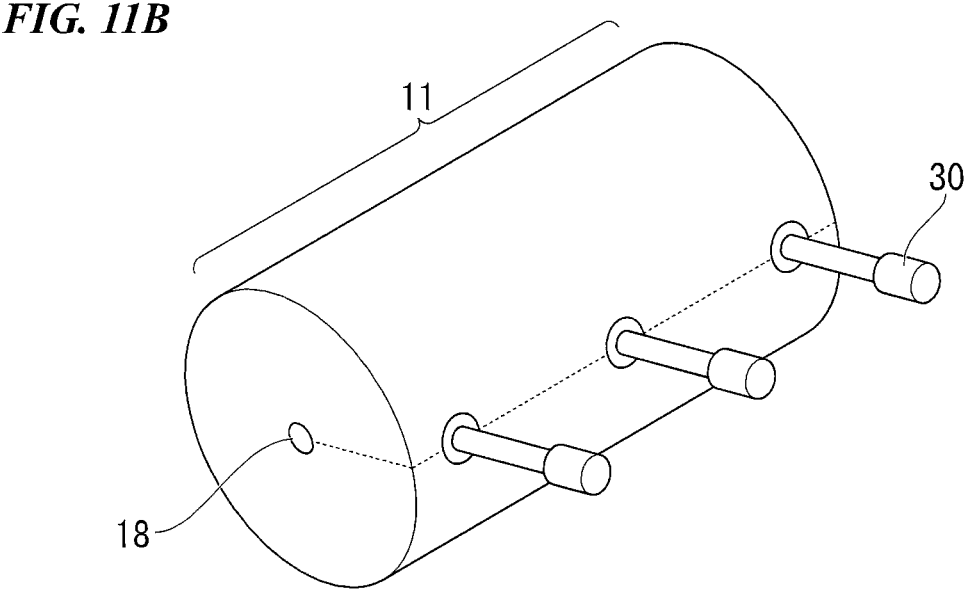
FIG. 11B is a perspective view illustrating an external appearance of the compressor section in the first embodiment of the present invention.

In FIG. 11A, on a plane perpendicular to the rotary shaft 18 at the positions of all access ports 21, a straight line extending from the center position of the rotary shaft 18 to the direction of the access port 21 is horizontal. In this case, an angle corresponding to the position of the access port 21 is 0 deg, and all the access ports 21 are horizontally arranged. When the borescopes 30 are inserted into the access ports 21, the borescopes 30 are horizontally arranged as illustrated in FIG. 11B. Because the borescope 30 is inserted to be approximately perpendicular to the surface of the casing 20, an angle corresponding to a position of a tip end of the borescope 30 is also 0 deg.

Figure 12A:
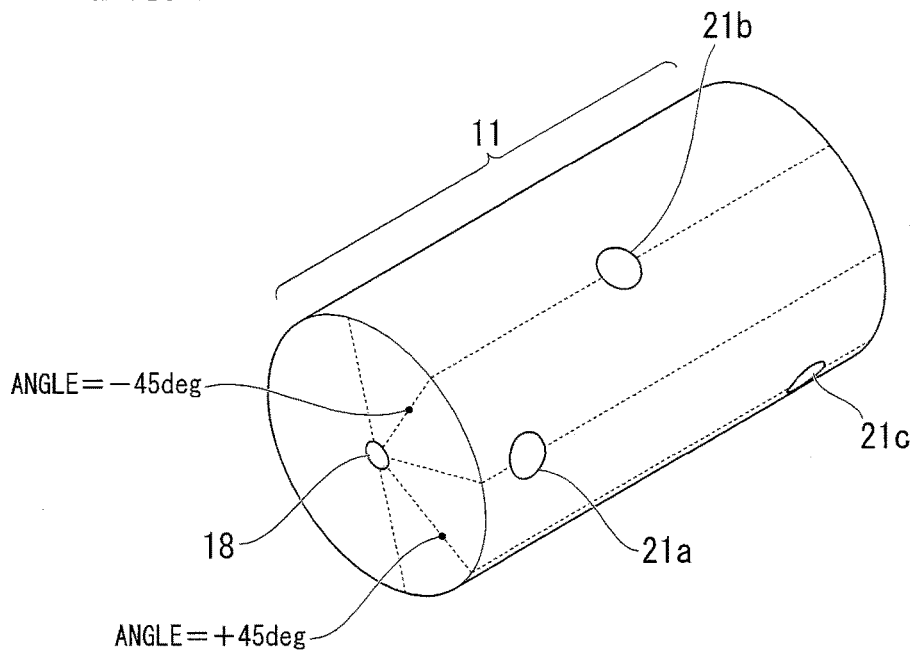
FIG. 12A is a perspective view illustrating an external appearance of the compressor section in the first embodiment of the present invention.

The angle of the position at which the access port 21 is installed may not be 0 deg, and an angle of a position at which each access port 21 is installed may be different. FIG. 12A schematically illustrates an external appearance of the compressor section 11 having the access port 21 installed at a position at which the angle is different. A front-side access port 21*a* corresponds to a stage Stg1, a center access port 21*b* corresponds to a stage Stg2, and a rear-side access port 21*c* corresponds to a stage Stg3.

Figure 12B:
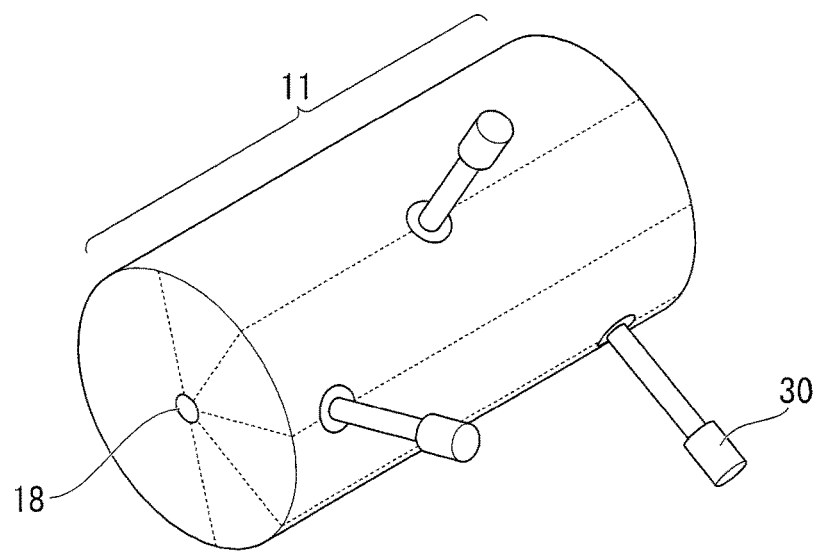
FIG. 12B is a perspective view illustrating an external appearance of the compressor section in the first embodiment of the present invention.

An angle of a position at which the access port 21*a* is installed is 0 deg, an angle of a position at which the access port 21*b* is installed is −45 deg, and an angle of a position at which the access port 21*c* is installed is +45 deg. Compared to the access port 21*a*, the access port 21*b* is present at a position rotated 45 deg above the center of the rotary shaft 18. On the other hand, compared to the access port 21*a*, the access port 21*c* is at a position rotated by 45 deg below the center of the rotary shaft 18. When the borescope 30 is inserted into this access port 21, the borescope 30 is also installed at a different angle as illustrated in FIG. 12B. Because the borescope 30 is inserted to be approximately perpendicular to the surface of the casing 20, the angle corresponding to the position of the tip end of the borescope 30 is the same as an angle of a position at which the access port 21 is installed.

Figure 13:
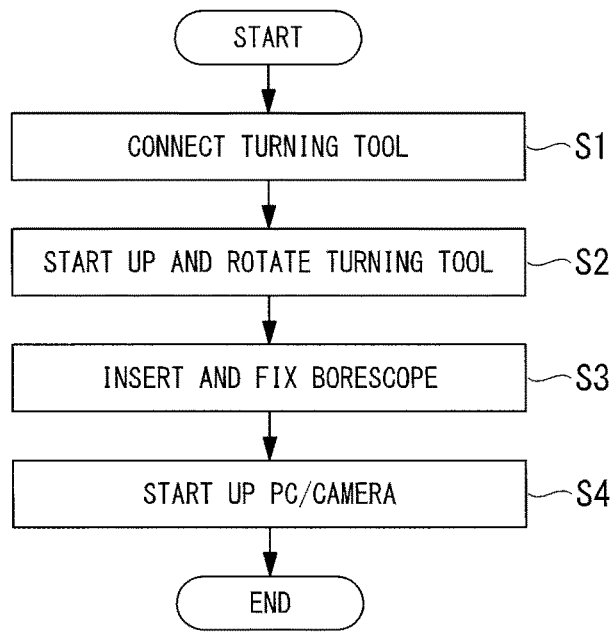
FIG. 13 is a flowchart illustrating a flow of a task to be performed before photography starts in the first embodiment of the present invention.

Next, a task necessary for preparation before the photography by the photography software starts will be described. FIG. 13 illustrates a flow of a task to be performed before the photography starts. In step S1, the turning tool 2 is connected to the gear box 22 of the jet engine 1. In step S2, the turning tool 2 starts up, and the rotary shaft 18 starts to rotate at a predetermined speed. The turning tool 2 constantly rotates at a predetermined speed in a state in which a connection to the gear box 22 is established. During the use of the photography software, control such as a change or stop of a rotation speed is not performed. Thereby, the blade also rotates at a constant speed.

In step S3, before the use of the photography software, the borescope 30 is inserted into each access port 21 and fixed by the fixing tool 31. At this time, the borescope 30 is installed in the photography area (photography area A1) closest to the rotary shaft 18. In step S4, the PC 33 and all the cameras 32 start up.

Although the borescope 30 is inserted into the access port 21 after the turning tool 2 has started up in this embodiment, the borescope 30 may be inserted into the access port 21 before the turning tool 2 starts up. In addition, although the PC 33 and the cameras 32 start up after the borescope 30 has been inserted into the access port 21 in this embodiment, the PC 33 and the cameras 32 may start up before the borescope 30 is inserted into the access port 21.

Figure 14:
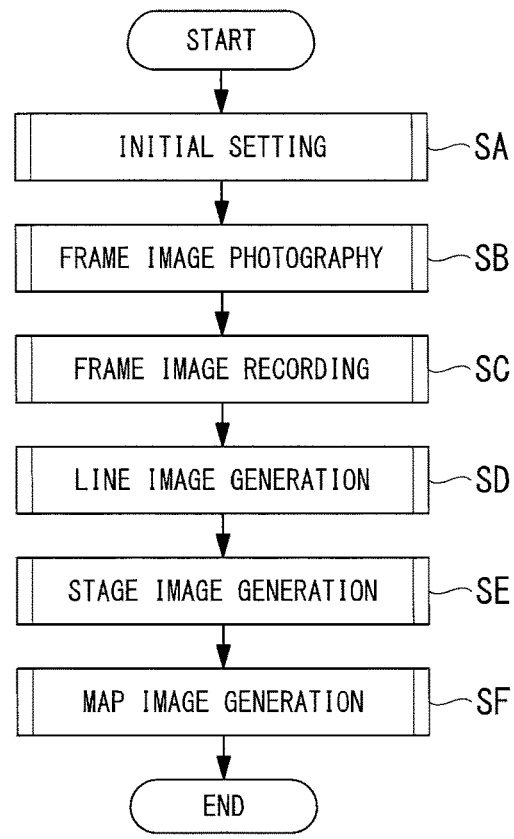
FIG. 14 is a flowchart illustrating a flow of an operation of photography software in the first embodiment of the present invention.

Next, a flow of the operation of the photography software will be described. FIG. 14 illustrates a flow of the overall operation of the photography software. In step SA, initial setting is performed to set various parameters for the photography software. In step SB, frame image photography is performed. In step SC, frame image recording is performed. In step SD, line image generation is performed. In step SE, stage image generation is performed. In step SF, map image generation is performed. The line image, the stage image, and the map image will be described later.

Figure 15:
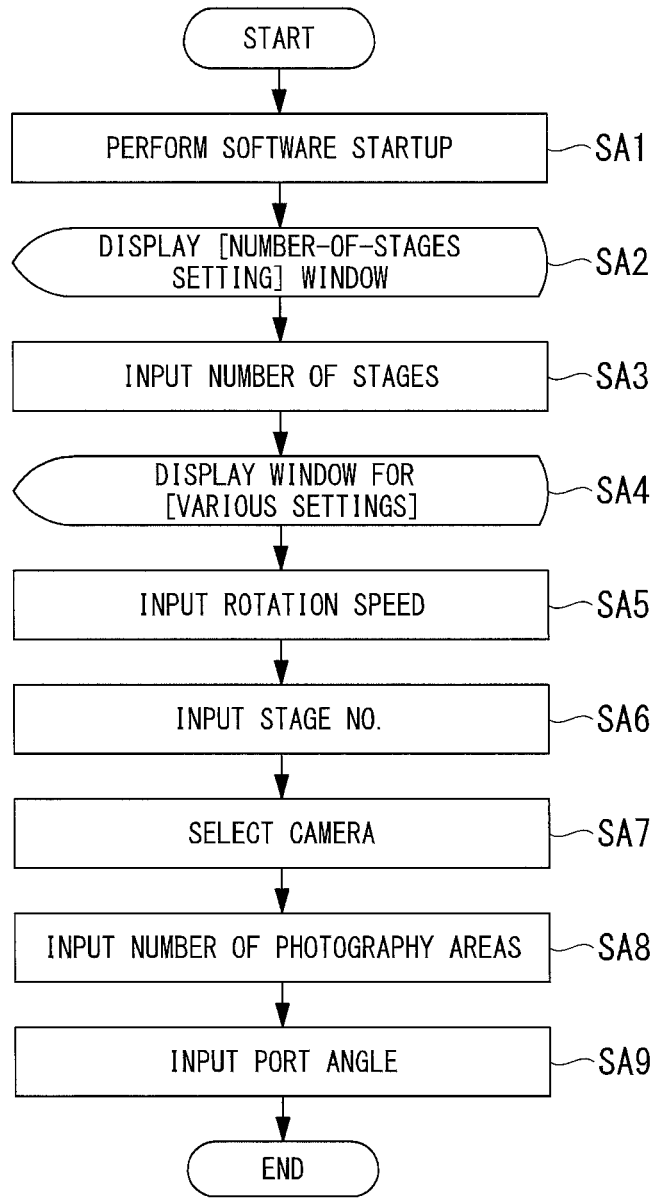
FIG. 15 is a flowchart illustrating a flow of an operation of the photography software in the first embodiment of the present invention.
Figure 16:
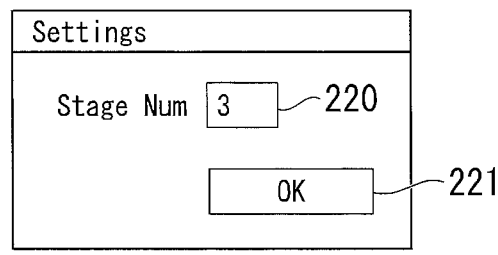
FIG. 16 is a diagram illustrating a "number-of-stages setting" window in the first embodiment of the present invention.

FIG. 15 illustrates a flow of the initial setting in step SA. In step SA1, the user inputs a photography software startup instruction and the photography software installed in the PC 33 starts up. In step SA2, a "number-of stages setting" window illustrated in FIG. 16 is displayed on the monitor 51. In the "number-of stages setting" window, a "number-of-stages" box 220 and an "OK" button 221 are included. In step SA3, when the user inputs the number of stages to be used to the "number-of-stages" box 220 and presses the "OK" button 221, the CPU 52c recognizes the input number of stages. In this embodiment, the number of stages is set to "3."

Figure 17:
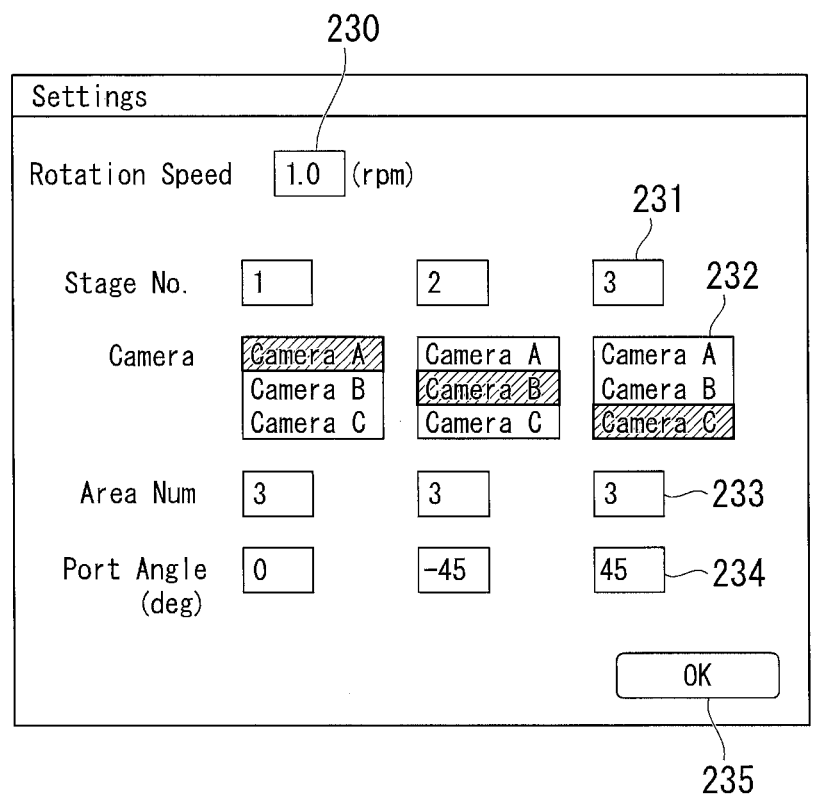
FIG. 17 is a diagram illustrating a window for "various settings" in the first embodiment of the present invention.

In step SA4, a window for "various settings" illustrated in FIG. 17 is displayed on the monitor 51. In the window for "various settings," a "rotation speed" box 230, a "stage No." box 231, a "camera" box 232, a "number-of-photography-areas" box 233, a "port angle" box 234, and an "OK" button 235 are included.

In step SA5, the user inputs a blade rotation speed to the "rotation speed" box 230 and the CPU 52c recognizes the input rotation speed. Although a unit of the rotation speed is rotations per minute (rpm) in this embodiment, the unit of the rotation speed may be any unit. This rotation speed is the same value as the rotation speed set in the turning tool 2. In this embodiment, "1.0" is input as the rotation speed. In step SA6, the user inputs a number of a stage to be used (hereinafter referred to as "stage No.") to the "stage No." box 231 and the CPU 52c recognizes the input stage number. In this embodiment, "1," "2," and "3" are input as the stage No.

In step SA7, the user selects a type of camera (line sensor) to be used in each stage in the "camera" box 232 and the CPU 52c recognizes the selected type of camera. In the "camera" box 232, names of cameras currently connected to the PC 33 are listed and displayed. In step SA8, the user inputs the number of photography areas in each stage to the "number-of-photography-areas" box 233 and the CPU 52c recognizes the input number of photography areas. In this embodiment, in all stages, "3" is input as the number of photography areas.

In step SA9, the user inputs an angle (hereinafter referred to as a port angle) of a position at which the access port 21 is installed in each stage to the "port angle" box 234 and the CPU 52c recognizes the input port angle. In this embodiment, the unit of the port angle is deg. Hereinafter, the case in which the access port 21 is disposed as in FIG. 12A will be described. As port angles of the stages Stg1, Stg2, and Stg3, "0," "−45," and "+45" are input. Thereafter, the user presses the "OK" button 235 and the CPU 52c detects the pressing of the "OK" button 235. In the "stage No." box 231, the "camera" box 232, the "number-of-photography-areas" box 233, and the "port angle" box 234, input items equal in number to the number of stages set in the "number-of-stages setting" window 231 are displayed.

Figure 18:
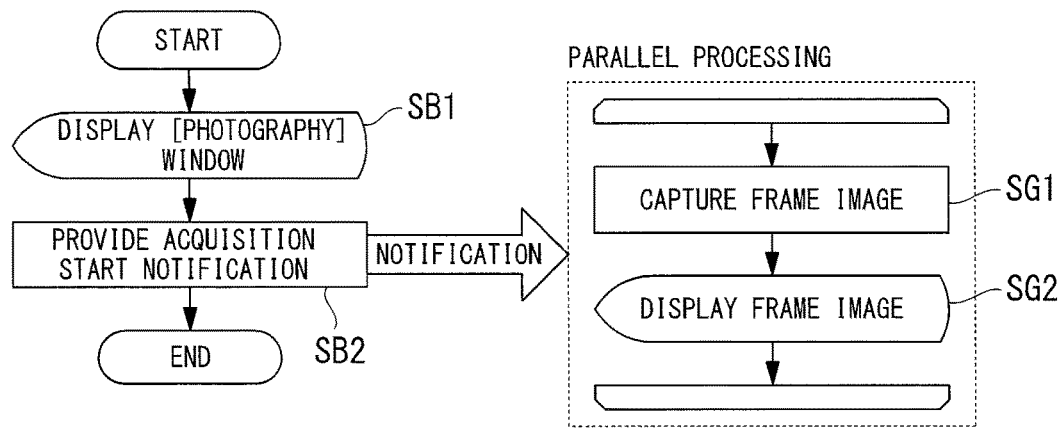
FIG. 18 is a flowchart illustrating a flow of an operation of the photography software in the first embodiment of the present invention.

FIG. 18 illustrates a flow of frame image photography in step SB. A frame image is an image (image data) for one frame acquired from the camera 32 having the line sensor. When images for one line are continuously accumulated by continuously performing imaging and a time for one frame has elapsed, the line sensor outputs the accumulated images as the frame images. For example, when a frame rate of the line sensor is 1 frame per second (fps), one image that is long in a vertical direction is output every 1 sec as the frame image from the line sensor and received by the PC 33.

A plurality of stages are provided in the compressor section 11, the borescope 30 is inserted into the access port 21 corresponding to each stage, and the cameras 32 connected to the borescopes 30 simultaneously generate frame images independent of each other. The frame image generated by each camera 32 is received by the PC 33. The frame image received by the PC 33 is identified for each stage No. input to the "stage No." box 231.

Figure 19:
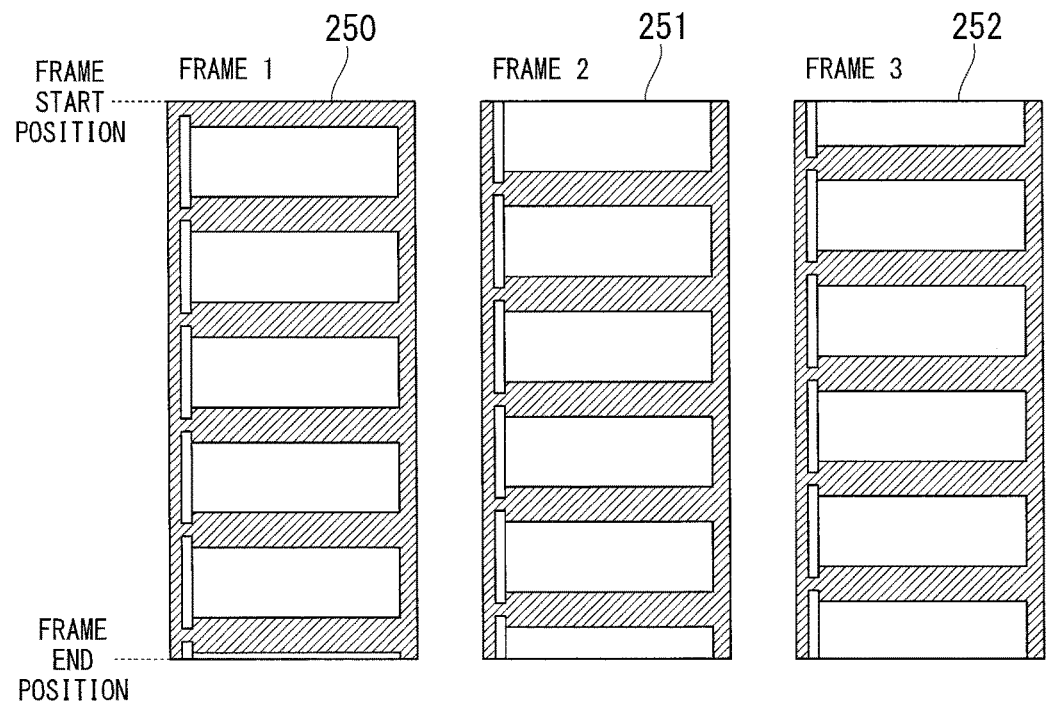
FIG. 19 is a diagram illustrating a frame image in the first embodiment of the present invention.

FIG. 19 illustrates frame images sequentially acquired from the cameras 32. In one frame image, a plurality of blades photographed in 1 sec are shown. In FIG. 19, frame images 250, 251, and 252 for three continuous frames are illustrated. The frame images each include an image of one line of the line sensor for a plurality of lines. A horizontal direction is a line direction (a direction in which pixels are arranged) of the line sensor. A position of the top of each frame image is a position (frame start position) of an image photographed at the start timing of each frame. A position of the bottom of each frame image is a position (frame end position) of an image photographed at the end timing of each frame. In each frame image, a plurality of blades cyclically disposed in the same stage are arranged in the vertical direction. When the rotary shaft 18 rotates at a constant speed, a vertical width and interval of the blade shown in the frame image is constant.

Figure 20:
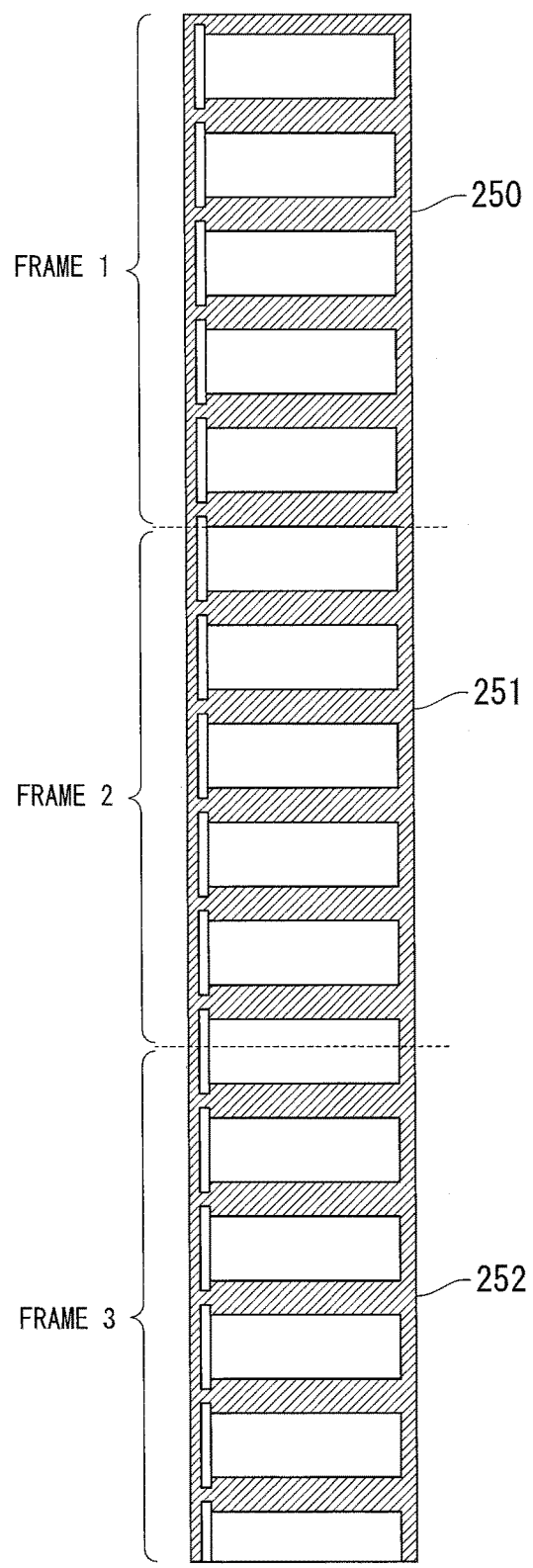
FIG. 20 is a diagram illustrating an image obtained by combining frame images in the first embodiment of the present invention.

Because a frame image 251 is generated in a frame immediately after the frame in which the frame image 250 has been generated, a blade shown at the frame end position of the frame image 250 is the same as a blade shown at the frame start position of the frame image 251. Likewise, a blade shown at the frame end position of the frame image 251 is the same as a blade shown at the frame start position of the frame image 252. When these frame images are combined in the vertical direction so that the frame end position of the frame image is adjacent to the frame start position of a frame image next to the frame image, one image including a plurality of blades continuously photographed is obtained as illustrated in FIG. 20.

Figure 21:
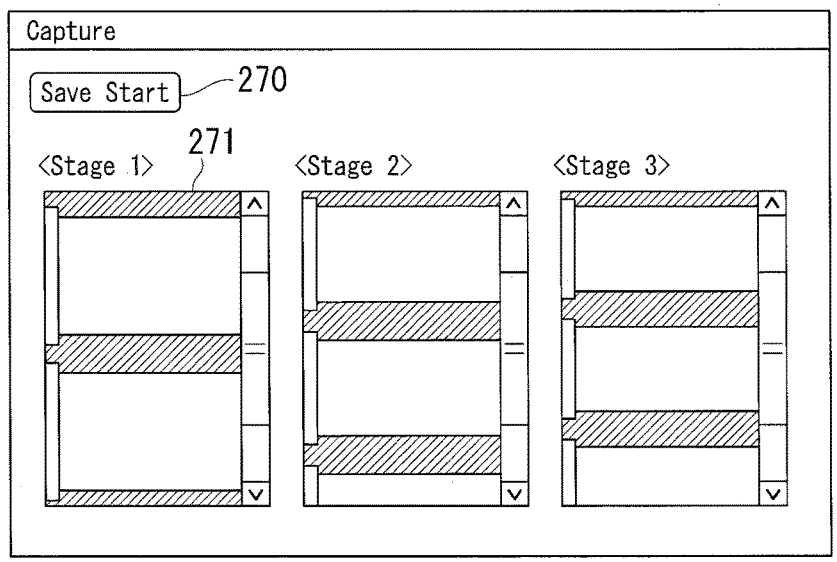
FIG. 21 is a diagram illustrating a "photography" window in the first embodiment of the present invention.

In step SB1, the "photography" window illustrated in FIG. 21 is displayed on the monitor 51. A "recording start" button 270 and a "frame image" box 271 are included in the "photography" window.

In step SB2, a notification of an acquisition start for a frame image is provided for parallel processing. The photography software performs the acquisition and display of the frame image using the parallel processing different from a flow of main processing. In step SG1 in the parallel processing, frame images from all the cameras 32 are received by the PC 33, and stored in the RAM 52a. In step SG2 in the parallel processing, the frame images are displayed in "frame image" boxes 271. The "frame image" boxes 271 are provided to be equal in number to the number of stages input to the "number-of-stages" box 220. The frame image acquired from the camera 32 corresponding to each stage is displayed in the "frame image" box 271 corresponding to each stage. A scroll bar is attached to the "frame image" box 271, and the user scrolls the scroll bar, thereby moving and displaying the frame image in a longitudinal direction. The processes of steps SG1 and SG2 in the parallel processing are iterated until the operation of the photography software ends.

Figure 22:
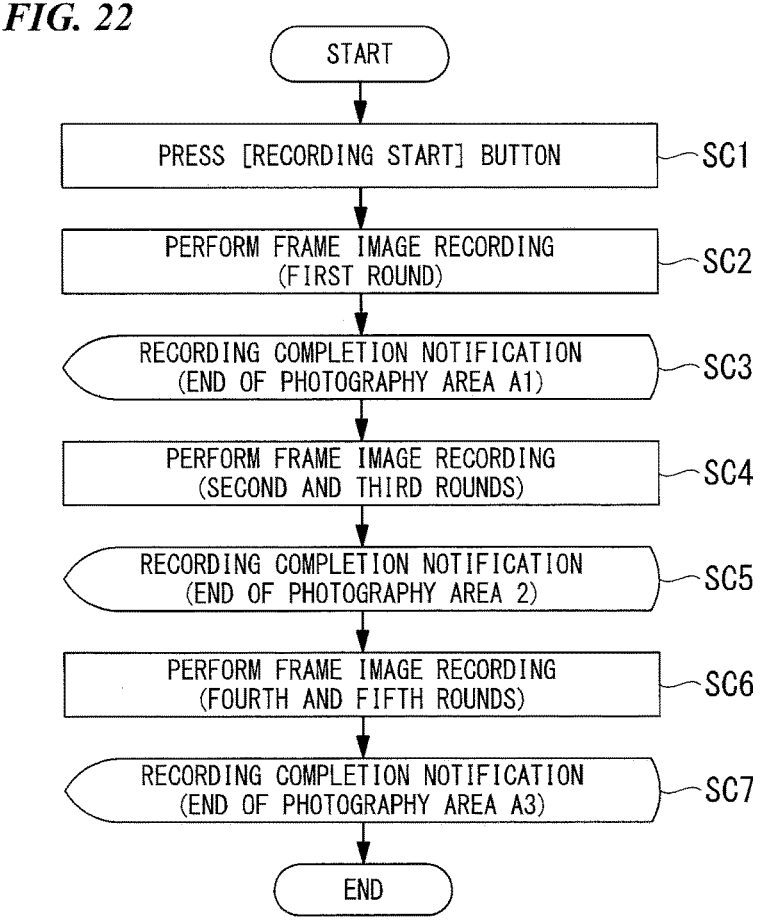
FIG. 22 is a flowchart illustrating a flow of an operation of the photography software in the first embodiment of the present invention.

FIG. 22 illustrates a flow of frame image recording in step SC. In step SC1, the user presses the "recording start" button 270 and the CPU 52c detects the pressing of the "recording start" button 270. The timing at which the pressing of the "recording start" button 270 has been detected is held in the RAM 52a. In step SC2, the CPU 52c sequentially reads frame images captured in the photography areas A1 of the stages from the RAM 52a, and records the read frame images on the HDD 52b. When a capacity of the RAM 52a is sufficiently large, a subsequent process may be performed while the frame images are stored in the RAM 52a without being recorded on the HDD 52b.

In step SC3, at a point in time at which the rotary shaft 18 has made one rotation (a rotation of 360 deg) after the recording of the frame image in step SC2 has started (at a point in time at which a first rotation has been completed), a message is displayed on the monitor 51 and the user is notified of the completion of the recording of the frame image of the photography area A1 and a movement instruction for the borescope 30. The CPU 52c performs a process of calculating a time (rotation cycle) necessary for the rotary shaft 18 to make one rotation from a rotation speed input in the "rotation speed" box 230 and displaying the above-described message at a point in time at which the rotary shaft 18 has made one rotation. For example, if the rotation speed is 1.0 rpm, the rotation cycle is 1.0 min. While the rotary shaft 18 makes one rotation, the borescope 30 is fixed to a position at which light from the photography area A1 is acquired.

The user moves the borescope 30 of each stage to a position at which light from the photography area A2 is acquired from the point in time at which the first rotation has been completed to when a second rotation is completed. Because the movement of the borescope 30 is to be completed from the point in time at which the photography of the photography area A1 has been completed to when the rotary shaft 18 makes one rotation, the remaining time up to the movement completion is displayed on the monitor 51.

In step SC4, frame images captured from the point in time at which the first rotation has been completed are sequentially recorded on the HDD 52b. Frame image recording is also performed while the borescope 30 moves. Because the borescope 30 moves to a position at which light from the photography area A2 is acquired until the second rotation is completed, a frame image captured in the photography area A2 is recorded after the point in time at which the second rotation has been completed.

In step SC5, at the point in time at which the rotary shaft 18 has made three rotations after the frame image recording has started in step SC2 (the point in time at which a third rotation has been completed), a message is displayed on the monitor 51 and the user is notified of the completion of the recording of the frame image of the photography area A2 and the movement instruction for the borescope 30.

The user moves the borescope 30 of each stage to a position at which light from the photography area A3 is acquired from the point in time at which the third rotation has been completed to when a fourth rotation is completed. In step SC6, frame images captured from the point in time at which the third rotation has been completed are sequentially recorded on the HDD 52b. Frame image recording is also performed while the borescope 30 moves. Because the borescope 30 moves to a position at which light from the photography area A3 is acquired until the fourth rotation is completed, a frame image captured in the photography area A3 is recorded after the point in time at which the fourth rotation has been completed.

In step SC7, at the point in time at which the rotary shaft 18 has made five rotations after the frame image recording has started in step SC2 (the point in time at which a fifth rotation has been completed), a message is displayed on the monitor 51 and the user is notified of the completion of the recording of the frame image of the photography area A3. At this time, the CPU 52c ends the frame image recording. Thus, frame image recording of all photography areas is completed.

Figure 23:
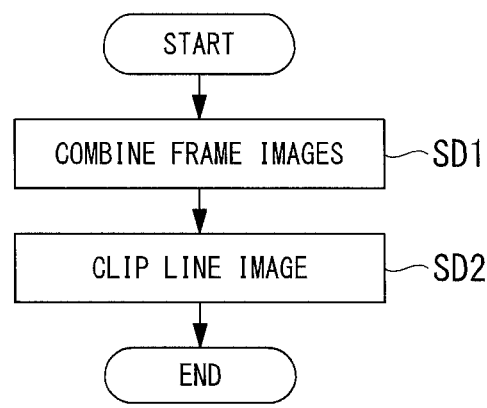
FIG. 23 is a flowchart illustrating a flow of an operation of the photography software in the first embodiment of the present invention.
Figure 24:
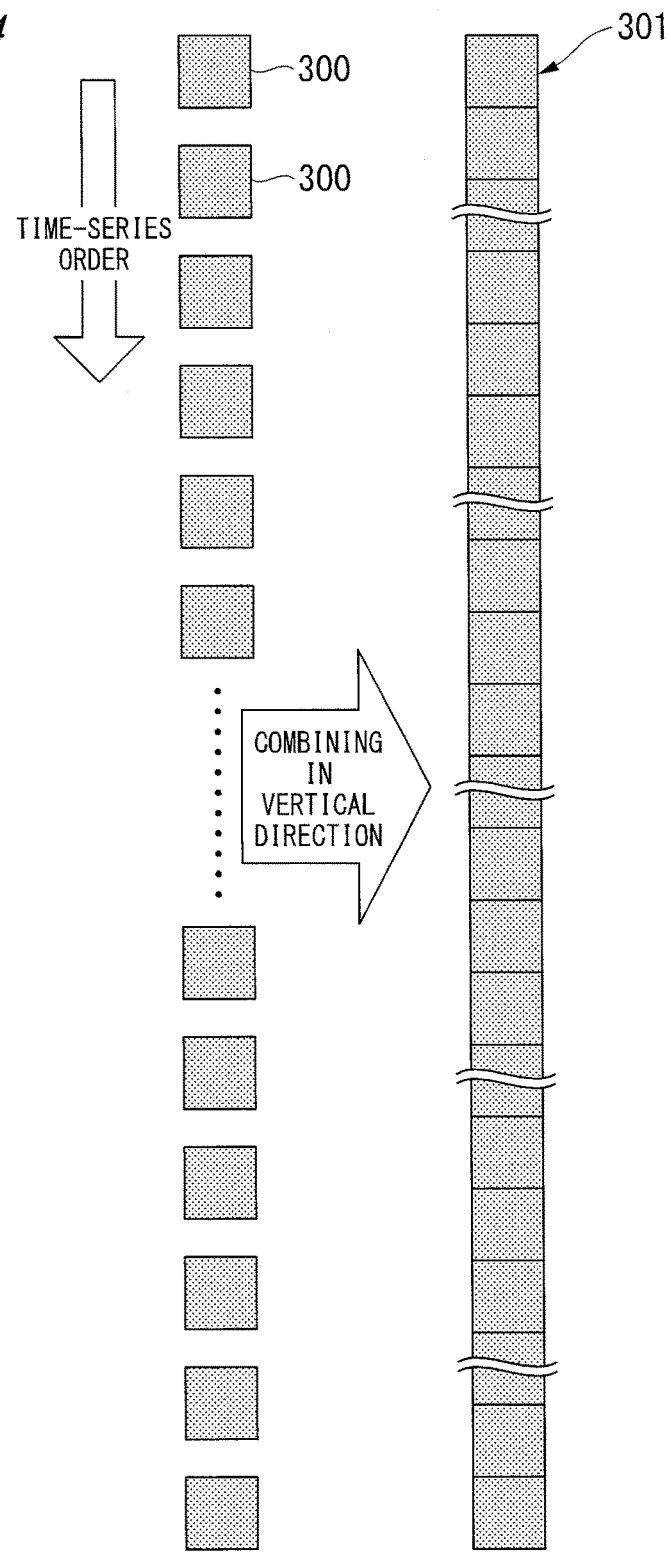
FIG. 24 is a diagram illustrating a state in which a pile image is generated in the first embodiment of the present invention.
Figure 25:
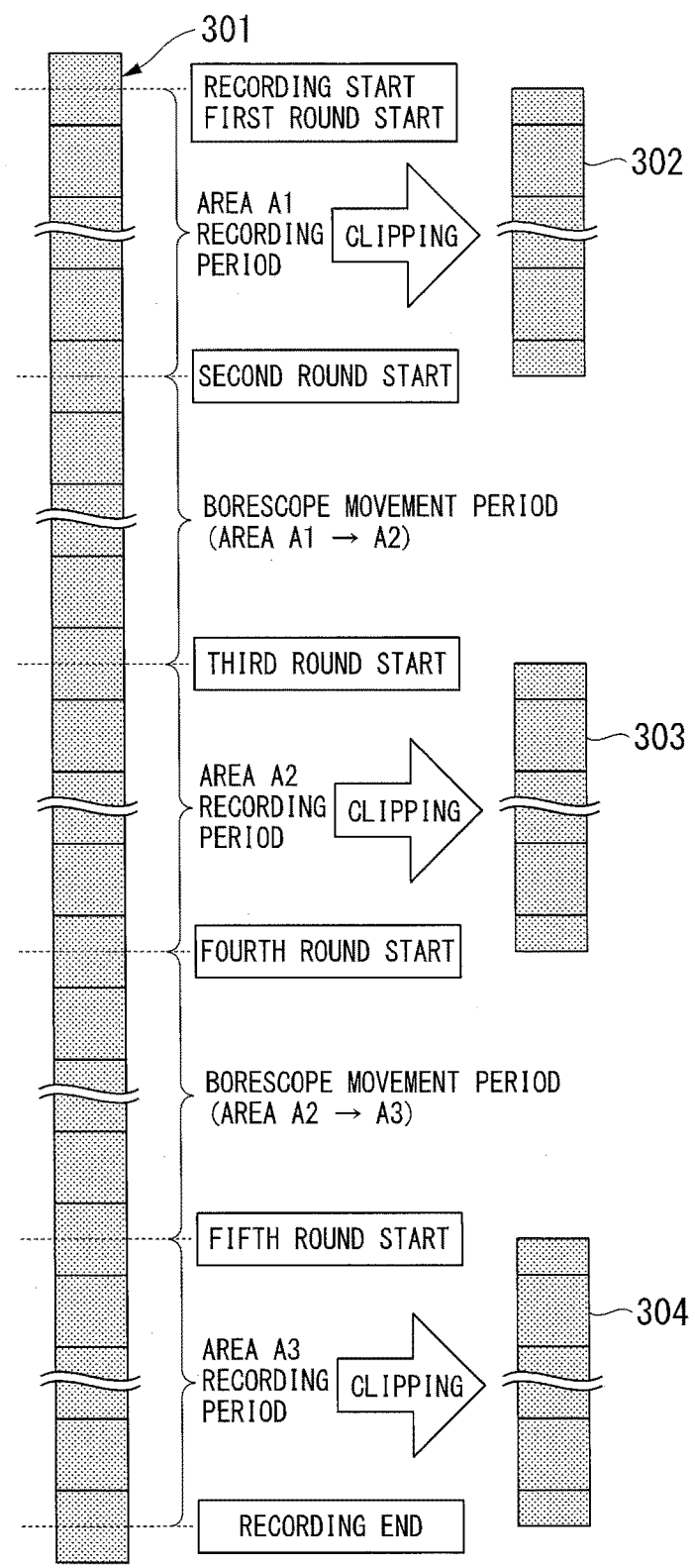
FIG. 25 is a diagram illustrating a state in which a line image is generated in the first embodiment of the present invention.

FIG. 23 illustrates a flow of line image generation in step SD. Each of FIGS. 24 and 25 illustrates a state in which a line image is generated. The line image is an image obtained by photographing blades for just one round of a certain photography area.

In step SD1, the CPU 52c arranges and combines all frame images 300 captured and recorded in the same photography area in the same stage in the vertical direction in time-series order as illustrated in FIG. 24. Hereinafter, an image combined in the vertical direction is described as a pile image 301. In the pile image 301, a plurality of blades are cyclically arranged in the vertical direction.

In step SD2, the CPU 52c generates thin and long rectangular line images 302, 303, and 304 in the vertical direction by clipping an image area during a recording period of each of the photography areas A1, A2, and A3 from the pile image 301 as illustrated in FIG. 25. More specifically, the line images 302, 303, and 304 are generated as follows. The CPU 52c determines a position at which the clipping of the line image 302 starts based on an imaging start timing of a first frame image among frame images constituting the pile image 301 and a timing at which the pressing of the "recording start" button 270 has been detected. For example, when the timing at which the pressing of the "recording start" button 270 has been detected is a timing at which the time of one half of one frame has elapsed from the imaging start timing of the frame image, a position at which the clipping of the line image 302 starts becomes a position of one half of a vertical length of a first frame image.

Subsequently, the CPU 52c determines a position at which the clipping of the line image 302 ends. Because the rotation cycle is obtained, an image position corresponding to a timing at which a time for one rotation has elapsed from the timing at which the pressing of the "recording start" button 270 has been detected becomes a position at which the clipping of the line image 302 ends. Because the start position and the end position of the clipping of the line image 302 are obtained, the CPU 52c generates the line image 302 by clipping an image area between these positions from the pile image 301.

The user moves the borescope 30 from the photography area A1 to the photography area A2 from when the first rotation is completed to when the second rotation is completed. An image position corresponding to the timing at which a time for two rotations has elapsed from the timing at which the pressing of the "recording start" button 270 has been detected becomes a position at which the clipping of the line image 303 starts, and an image position corresponding to the timing at which a time for three rotations has elapsed becomes a position at which the clipping of the line image 303 ends. The CPU 52c generates the line image 303 by clipping an image area between these positions from the pile image 301.

The user moves the borescope 30 from the photography area A2 to the photography area A3 from when the third rotation is completed to when the fourth rotation is completed. An image position corresponding to the timing at which a time for four rotations has elapsed from the timing at which the pressing of the "recording start" button 270 has been detected becomes a position at which the clipping of the line image 304 starts, and an image position corresponding to the timing at which a time for five rotations has elapsed becomes a position at which the clipping of the line image 304 ends. The CPU 52c generates the line image 304 by clipping an image area between these positions from the pile image 301.

The processes of steps SD1 and SD2 are performed on frame images of all photography areas of all stages, and three line images are obtained for each stage.

Figure 26:
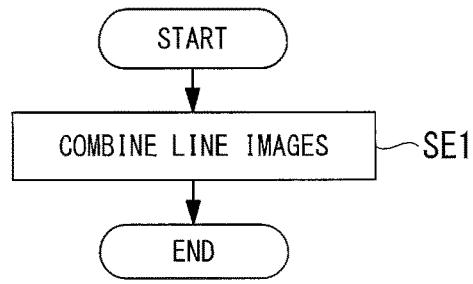
FIG. 26 is a flowchart illustrating a flow of an operation of the photography software in the first embodiment of the present invention.
Figure 27:
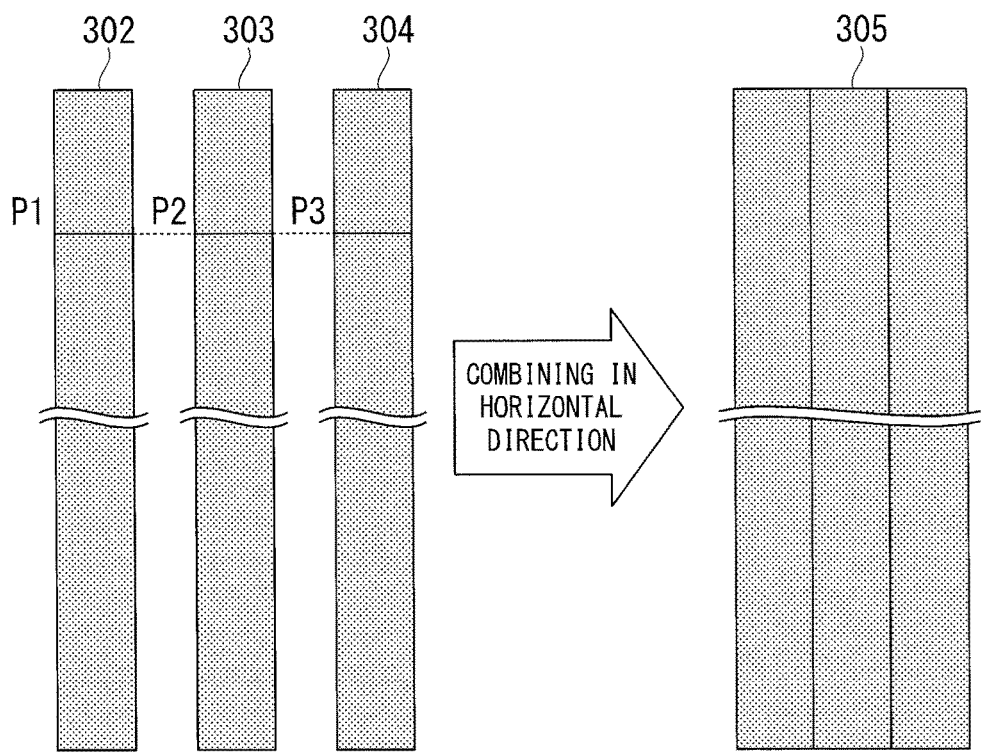
FIG. 27 is a diagram illustrating a state in which a stage image is generated in the first embodiment of the present invention.

FIG. 26 illustrates a flow of stage image generation in step SE. FIG. 27 illustrates a state in which a stage image is generated. The stage image is an image obtained by photographing blades for just one round of a certain stage.

In step SE1, the CPU 52c generates a thin and long rectangular stage image 305 in the vertical direction by arranging and combining all the line images 302, 303, and 304 captured and recorded in the same stage in the horizontal direction as illustrated in FIG. 27. The line images 302, 303, and 304 are combined in a state in which top positions of the line images are aligned. Because each line image includes images captured for a time for just one rotation, the end position of each line image is also aligned by aligning the top position of each line image.

Each of the timing at which a certain position P1 of the vertical direction in the line image 302 is photographed, the timing at which the same position P2 as the position P1 in the line image 303 is photographed, and the timing at which the same position P3 as the position P2 in the line image 304 is photographed is shifted by every one-rotation time, that is, every rotation cycle. Because the blade returns to the same position when the rotation shaft 18 makes one rotation, the blade shown at the position P1 of the line image 302, the blade shown at the position P2 of the line image 303, and the blade shown at the position P3 of the line image 304 are the same blade. Because the same blade is divided into three photography areas and photographed, the same blade is photographed to extend over a horizontal direction of the line images 302, 303, and 304. The position of the same blade in each line image is aligned by merely arranging and combining the line images 302, 303, and 304 in the horizontal direction as described above.

The process of step SE1 is performed on map images of all stages and a stage image is obtained for each stage.

Figure 28:
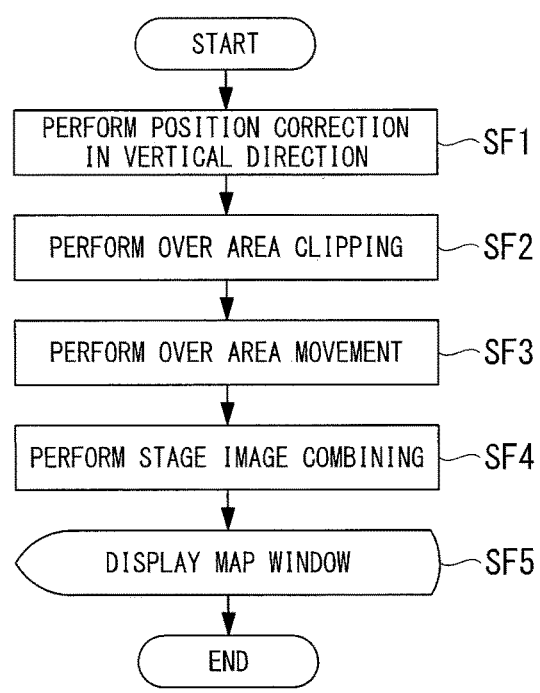
FIG. 28 is a flowchart illustrating a flow of an operation of the photography software in the first embodiment of the present invention.

FIG. 28 illustrates a flow of map image generation in step SF. Each of FIGS. 29 to 33 illustrates a state in which a map image is generated. The map image is an image obtained by photographing blades for just one round in a state in which a relative positional relationship between stages is held.

Figure 29:
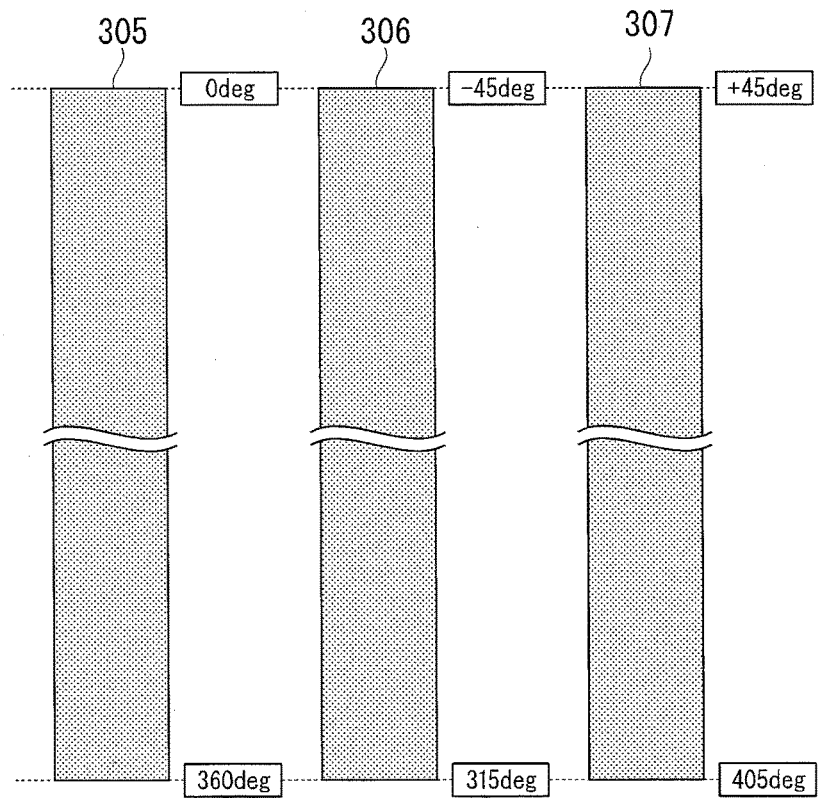
FIG. 29 is a diagram illustrating a state in which a map image is generated in the first embodiment of the present invention.

In step SF1, the CPU 52c corrects a position of the vertical direction of each stage image based on a port angle in each stage. More specifically, the following process is performed. First, as illustrated in FIG. 29, the CPU 52c arranges all stage images 305, 306, and 307 in the horizontal direction. The stage image 305 is an image captured in the stage Stg1 corresponding to the access port 21a in which a port angle is 0 deg. The stage image 306 is an image captured in the stage Stg2 corresponding to the access port 21b in which a port angle is −45 deg. The stage image 307 is an image captured in the stage Stg3 corresponding to the access port 21c in which a port angle is 45 deg.

Hereinafter, the position of the rotary shaft 18 is represented by an angle described using FIGS. 11A to 12B. The top position (the upper end position of the vertical direction) in the stage image 305 corresponds to a position of an angle of 0 deg. The top position in the stage image 306 corresponds to a position of the angle of −45 deg. The top position in the stage image 307 corresponds to a position of the angle of 45 deg. According to the rotation of the rotary shaft 18, in each stage, a position at which the angle is increased by only a rotation amount of the rotary shaft 18 is photographed. When the rotary shaft 18 makes one rotation, a position at which the angle is increased by 360 deg is photographed in each stage. Therefore, an image of the end position (the lower end position of the vertical direction) in the stage image 305 is an image obtained by imaging a position of an angle of 360 (=0+360) deg. The image of the end position in the stage image 306 is an image obtained by imaging a position of an angle of 315 (=−45+360) deg. The image of the end position in the stage image 307 is an image obtained by imaging a position of an angle of 405 (=45+360) deg.

Because the port angle of each access port 21 is different, it is difficult to align an image obtained by imaging the same position in the circumferential direction of the rotary shaft 18 in each stage in which the position is different in the shaft direction of the rotary shaft 18 at the same position of the vertical direction of each stage image by arranging each stage image in the horizontal direction to merely align an upper end and a lower end. Thus, the CPU 52c corrects the position of the vertical direction of each stage image according to the port angle of the access port 21 of each stage. According to this correction, a position at which each stage image is displayed is adjusted when each stage image is displayed as a map image as will be described later.

Figure 30:
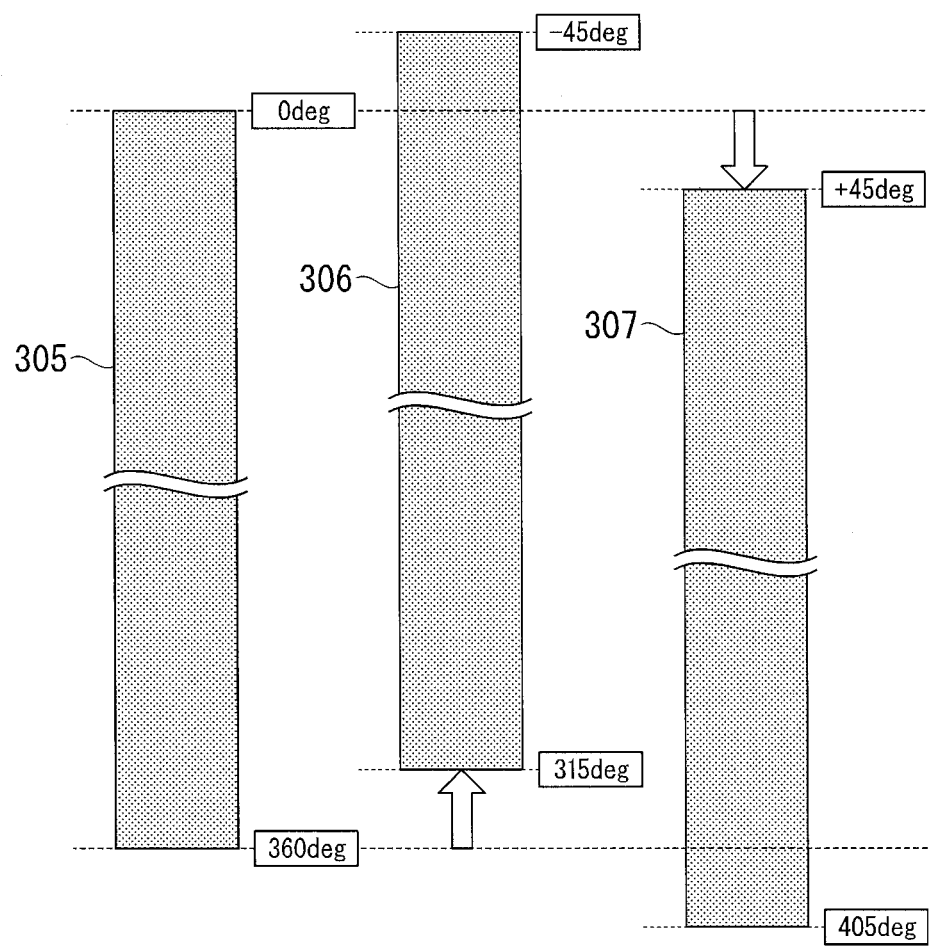
FIG. 30 is a diagram illustrating a state in which the map image is generated in the first embodiment of the present invention.

More specifically, the position of the vertical direction of each stage image is corrected as follows. As illustrated in FIG. 30, the CPU 52c shifts each stage image in an upward or downward direction by a port angle of the access port 21 of each stage. Specifically, because the port angle is 0 deg in the stage image 305, the position of the stage image 305 remains as it is. Because the port angle is −45 deg in the stage image 306, the position of the stage image 306 is shifted in the upward direction by ⅛ (=45/360) of a vertical size of the stage image. Because the port angle is 45 deg in the stage image 307, the position of the stage image 307 is shifted in the downward direction by ⅛ (=45/360) of the vertical size of the stage image.

According to the above-described correction, a relative position between stage images is corrected. In each stage image, in a certain part within a range in which the angle is 0 to 360 deg, an image obtained by imaging the same position in the circumferential direction of the rotary shaft 18 is present at the same position of the vertical direction.

Figure 31:
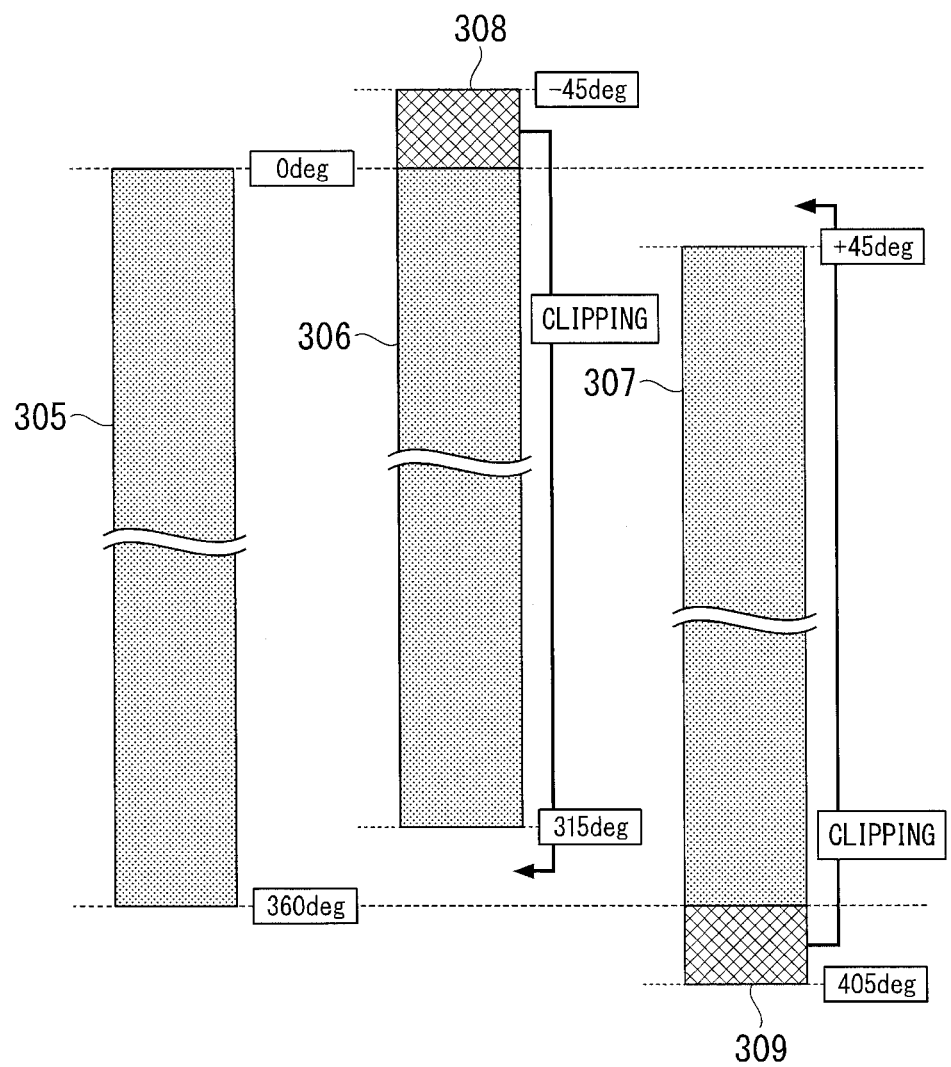
FIG. 31 is a diagram illustrating a state in which the map image is generated in the first embodiment of the present invention.

In step SF2, the CPU 52c clips an over area from the stage image. The over area is an image area obtained by imaging a position at which the angle exceeds a range of 0 to 360 deg in the stage image. Specifically, in the stage image 305, there is no over area. In the stage image 306, a range of an upper angle of −45 to 0 deg of the image is the over area. In the stage image 307, a range of a lower angle of 360 to 405 deg of the image is the over area. As illustrated in FIG. 31, an over area 308 is clipped from the stage image 306 and an over area 309 is clipped from the stage image 307.

Because the blade returns to the same position when the rotary shaft 18 makes one rotation, the image of a position corresponding to a certain angle is consistent with an image of a position corresponding to an angle shifted 360 deg from the angle in the stage image. Thus, an image of an area of a range of an angle of 315 to 360 deg which is absent in the stage image 306 is to be the same as that of an over area 308. In addition, an image of an area of a range of an angle of 0 to 45 deg which is absent in the stage image 307 is to be the same as that of an over area 309. Therefore, in each stage image, it is possible to align a position of the vertical direction of each stage image by replacing a part in which there is no image in a range of an angle of 0 to 360 deg with the over area.

Figure 32:
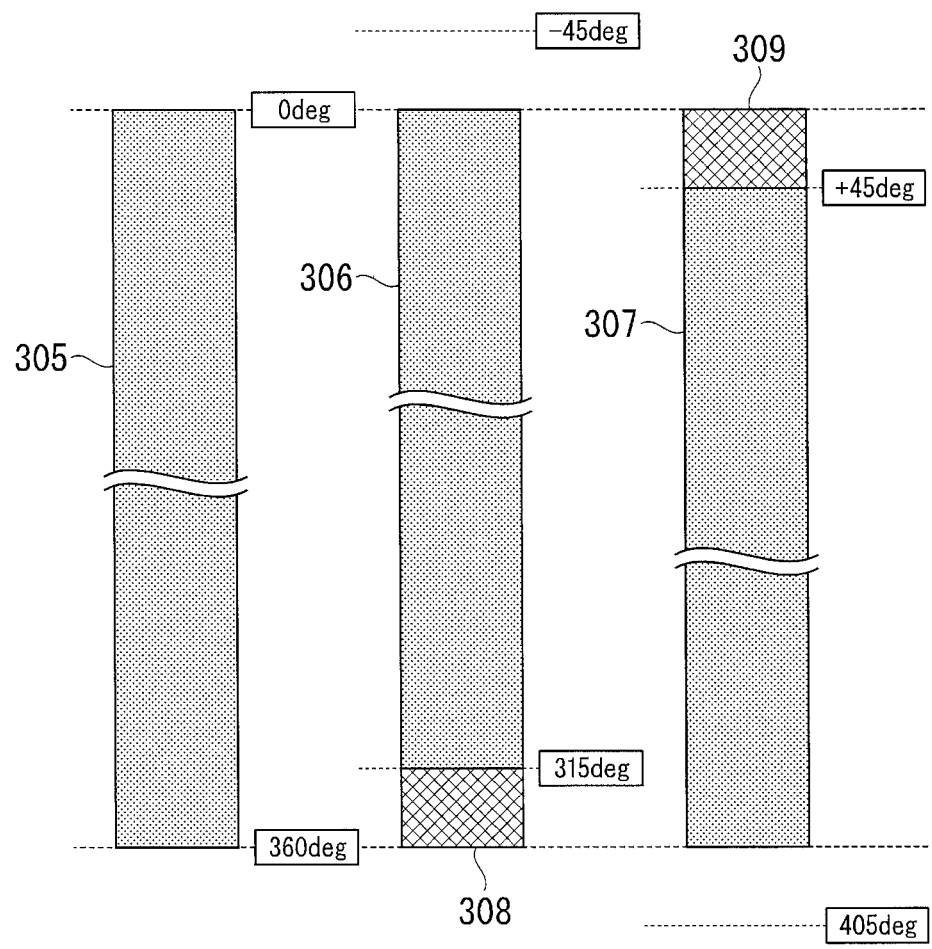
FIG. 32 is a diagram illustrating a state in which the map image is generated in the first embodiment of the present invention.

In step SF3, the CPU 52c moves the over area clipped in step SF2 to an end part opposite an end part of a stage image including the over area and combines the over area with the opposite end part. Specifically, in the stage image 305, there is no movement of the over area. In the stage image 306, as illustrated in FIG. 32, the over area 308 clipped from the top of the stage image 306 moves to the bottom of the stage image 306 and is combined with the stage image 306. In the stage image 307, as illustrated in FIG. 32, the over area 309 clipped from the bottom of the stage image 307 moves to the top of the stage image 307 and is combined with the stage image 307. In this manner, each stage image is corrected.

According to the above-described correction, the position of the vertical direction of each stage image is corrected. In each stage image, an image obtained by imaging the same position in the circumferential direction of the rotary shaft 18 is present at the same position of the vertical direction.

Figure 33:
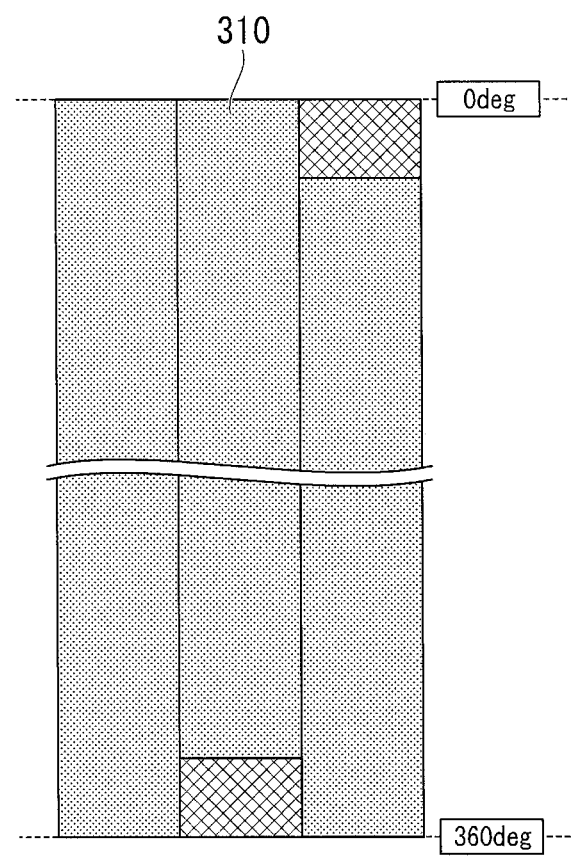
FIG. 33 is a diagram illustrating a state in which the map image is generated in the first embodiment of the present invention.
Figure 34:
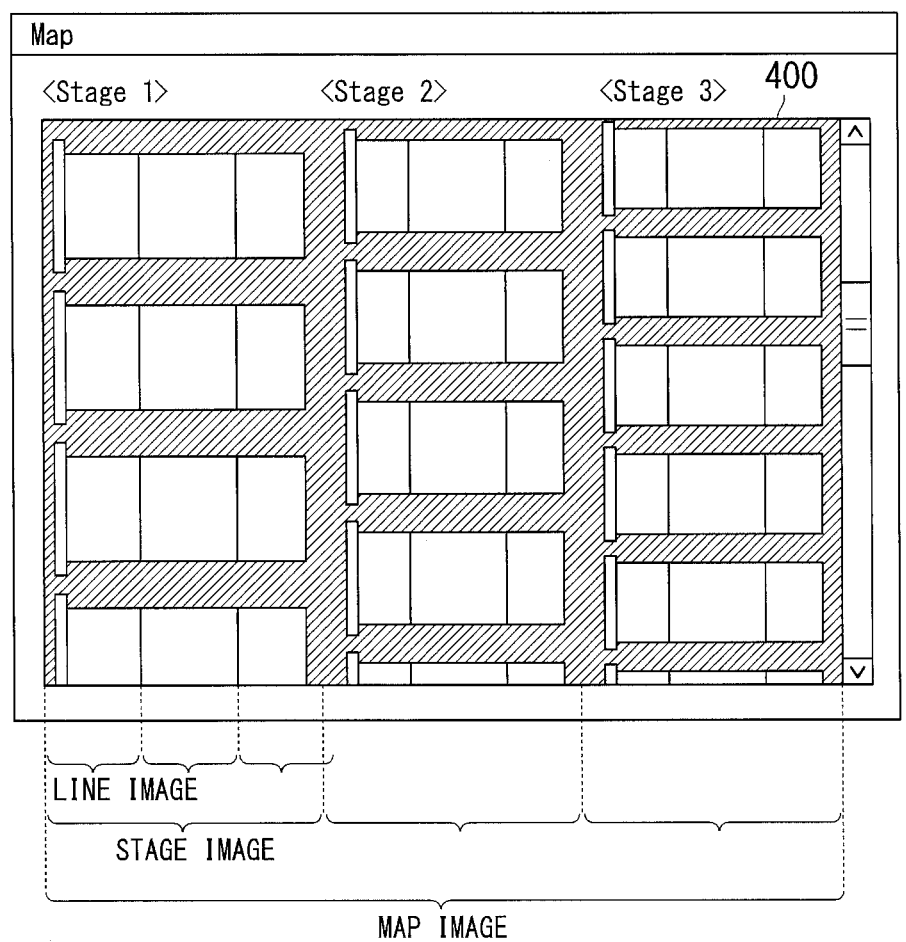
FIG. 34 is a diagram illustrating a "map" window in the first embodiment of the present invention.

In step SF4, the CPU 52c generates a rectangular map image 310 by arranging and combining stage images after the correction in the horizontal direction as illustrated in FIG. 33. In step SF5, the "map" window illustrated in FIG. 34 is displayed on the monitor 51. A "map image" box 400 is included in the "map" window and a map image is displayed on the "map image" box 400.

As illustrated in FIG. 34, in the map image, stage images captured at the stages Stg1, Stg2, and Stg3 are arranged in the horizontal direction. In each stage image, blades cyclically disposed in the circumferential direction of the rotary shaft 18 are arranged and shown in the vertical direction. In the stage images, map images captured in the photography areas A1, A2, and A3 are arranged in the horizontal direction. In each map image, a position of the same blade photographed to extend over each map image is aligned. In addition, in each stage image, a relative positional relationship of a blade related to a position in the circumferential direction of the rotary shaft 18 is held. A scroll bar is attached to the "map image" box 400, and the user scrolls the scroll bar, thereby moving and displaying the map image in a longitudinal direction.

Although a process related to the over area in steps SF2 and SF3 is performed after the position of the vertical direction of each stage image is corrected in step SF1 in this embodiment, the over-area-related process may be first performed and then the position of the vertical direction of each stage image may be corrected. In addition, a display may be performed in a state in which the generated map image is rotated a predetermined angle (for example, 90 deg). Although stage images are simultaneously captured in this embodiment, imaging may be performed by shifting the time. For example, the stage image 307 corresponding to the port angle of 45 deg starts to be captured. After an image for 45 deg has been captured, the stage image 305 corresponding to the port angle of 0 deg starts to be captured. Further, after an image for 0 deg has been captured, the stage image 306 corresponding to the port angle of −45 deg starts to be captured. That is, an imaging start timing of each stage image may be shifted according to a shift amount of the port angle.

Although the map image including a plurality of stage images is displayed in this embodiment, a stage image may be displayed for each stage without displaying the map image. In addition, although a plurality of stages are simultaneously photographed in this embodiment, only one borescope 30 may be inserted into the access port 21 to perform photography only in one stage, thereby generating a stage image from the acquired frame image.

As described above, according to this embodiment, it is possible to simultaneously capture a plurality of stage images and display a map image including the plurality of stage images. Photographing blades using the photography system of this embodiment provides the following merits. It is not necessary to particularly control the turning tool 2 and it is desirable to cause the turning tool 2 to make rotation at a constant speed. After the photography and frame image recording start, no operation other than the movement of the borescope 30 is necessary. Therefore, an operation to be performed by the user is a simple operation. A notification of the timing of movement of the borescope 30 is automatically provided by photography software. The user does not need to input the number of blades of each stage. Because simultaneous photography is performed by inserting a plurality of borescopes 30 corresponding to a plurality of stages into a plurality of access ports 21, it is possible to efficiently perform photography as compared to when photography is sequentially performed in stages by sequentially inserting one borescope 30 into the access port 21 corresponding to each stage.

The display of the map image has the following merits. In the map image, blade images of each stage are not separately displayed, and blade images are displayed in a state in which a positional relationship of blades of each stage within the real jet engine is held. Thus, the user can understand the state of the blades from the bird's eye view within the real jet engine. For example, when a defect occurs in a certain blade, the defect usually similarly occurs in a blade positioned in the periphery. The user can check the relevance of the defect between blades without performing a special operation by observing the map image. In particular, it is possible to check the relevance of the defect between blades disposed in different stages.

In addition, the user can check the relevance of the defect between blades disposed in the same stage by observing a stage image including a plurality of map images.

Second Embodiment

Next, the second embodiment of the present invention will be described. A configuration of a blade observation system according to this embodiment is similar to the configuration described in the first embodiment. An operation of photography software in the second embodiment is different from the operation described in the first embodiment.

When a rotary shaft 18 is caused to rotate, the rotary shaft 18 does not rotate at a constant speed and irregularity may occur in the rotation speed. Hereinafter, the irregularity of the rotation speed will be described as rotational irregularity. As factors causing the rotational irregularity, the case in which a turning tool 2 does not actually rotate at a constant speed even when the turning tool 2 is set so that the turning tool 2 rotates at a constant speed or a rotating force is not successfully transferred to a borescope 30, etc. are considered.

When this rotational irregularity occurs, the following problems occur when photography software is used.

A blade width (vertical width) shown in a captured image differs according to each blade.

Because irregularity also occurs in a rotation cycle, it is difficult to photograph blades for just one round and excess and deficiency occur in the number of photographed blades.

According to the above-described problems, as a result, it is difficult to generate an accurate stage image and map image.

Figure 35:
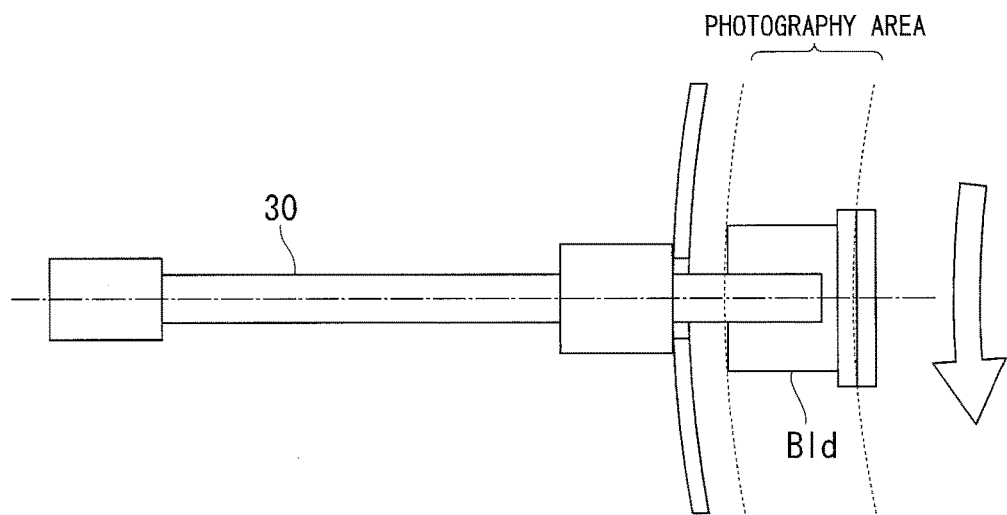
FIG. 35 is a diagram illustrating a photography area in a second embodiment of the present invention.

In this embodiment, even when the rotational irregularity occurs, photography software capable of generating an accurate stage image and map image is provided. Hereinafter, as illustrated in FIG. 35, an example in which a length of a blade Bld to be photographed is short, the number of photography areas is only one, and it is not necessary to move the borescope 30 will be described.

Figure 36:
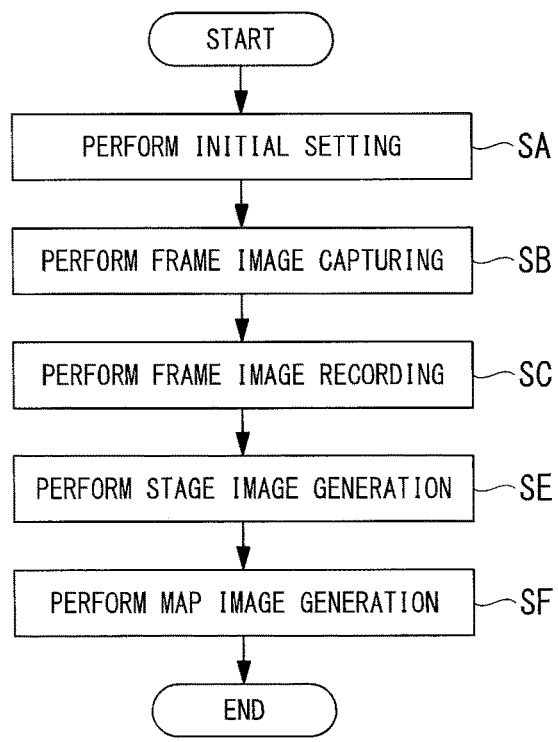
FIG. 36 is a flowchart illustrating a flow of an operation of photography software in the second embodiment of the present invention.

FIG. 36 illustrates a flow of an overall operation of the photography software. FIG. 36 is similar to FIG. 14 except that generation of a line image in step SD of FIG. 14 is eliminated. Description of a process similar to FIG. 14 is omitted.

Figure 37:
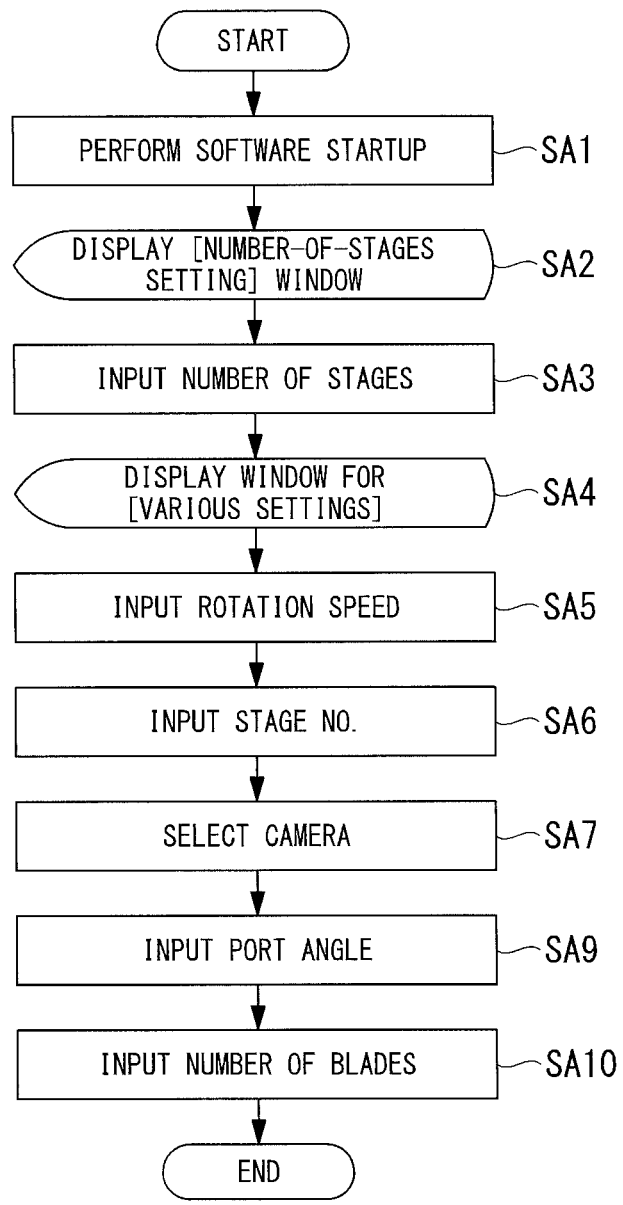
FIG. 37 is a flowchart illustrating a flow of an operation of the photography software in the second embodiment of the present invention.

FIG. 37 illustrates a flow of initial setting in step SA. FIG. 37 is similar to FIG. 15 except that an input of the number of photography areas in step SA8 of FIG. 15 is eliminated and that an input of the number of blades is performed in step SA10 after an input of a port angle is performed in step SA9. Description of a process similar to FIG. 15 is omitted.

Figure 38:
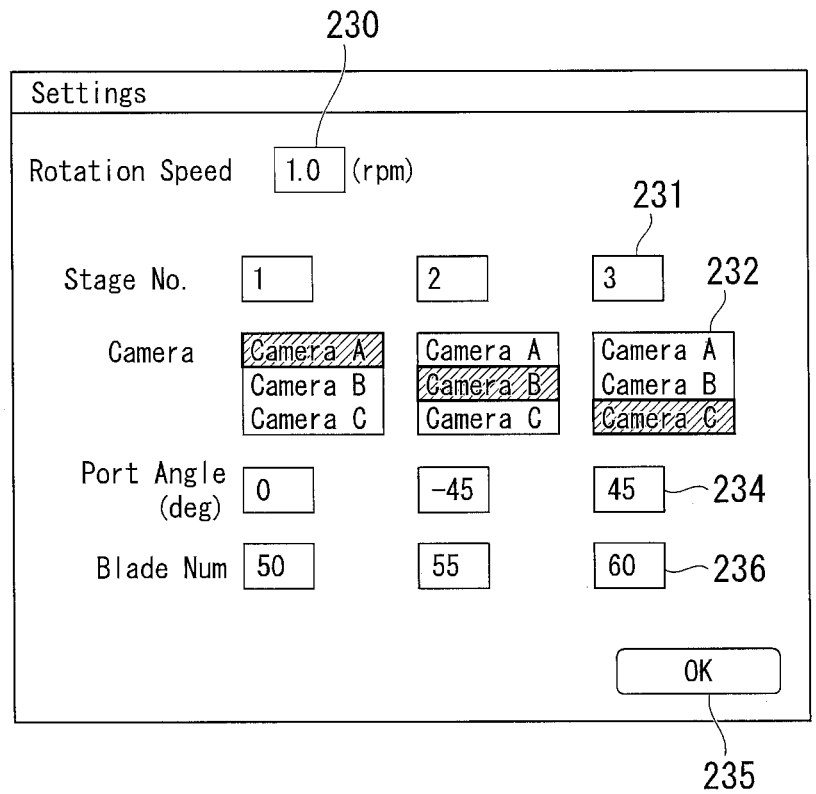
FIG. 38 is a diagram illustrating a window for "various settings" in the second embodiment of the present invention.

FIG. 38 illustrates a window for "various settings" displayed on the monitor 51 in step SA4. A "number-of-photography-areas" box 233 is deleted and a "number-of-blades" box 236 is added. In step SA10, when the user inputs the number of blades in each stage to the "number-of-blades" box 236 and presses an "OK" button 221, the CPU 52c recognizes the input number of blades. The number of blades is the number of blades for one round disposed around the rotary shaft 18 in each stage. In this embodiment, "50," "55," and "60" are input as the number of blades of the stages Stg1, Stg2, and Stg3.

Figure 39:
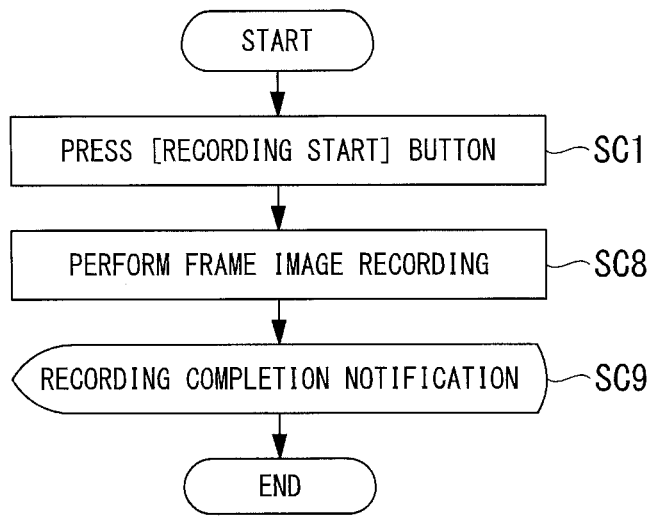
FIG. 39 is a flowchart illustrating a flow of an operation of the photography software in the second embodiment of the present invention.

FIG. 39 illustrates a flow of frame image recording in step SC. In step SC1, the user presses the "recording start" button 270 and the CPU 52c detects the pressing of the "recording start" button 270. The timing at which the pressing of the "recording start" button 270 has been detected is held in the RAM 52a. In step SC8, the CPU 52c sequentially reads frame images captured in stages from the RAM 52a and records the read frame images on the HDD 52b.

In step SC9, the rotary shaft 18 makes one rotation after frame image recording in step SC8 starts, a message is displayed on the monitor 51 at a point in time at which a predetermined time has elapsed from that point in time, and the user is notified of the fact that frame image recording for one round has been completed. At this time, the CPU 52c ends the frame image recording. Because rotational irregularity occurs in the rotation of the rotary shaft 18, blades for one round necessary for generating a stage image and a map image may not be photographed for a time corresponding to one rotation when the rotary shaft 18 rotates at a constant speed. Thus, in this embodiment, the timing at which a notification of frame image recording completion is provided is a timing at which a time slightly longer than a time from the start of frame image recording to the completion of one rotation (rotation cycle) has elapsed. Thus, a few more frame images are recorded compared to when frame images are recorded for a time consistent with one rotation.

Figure 40:
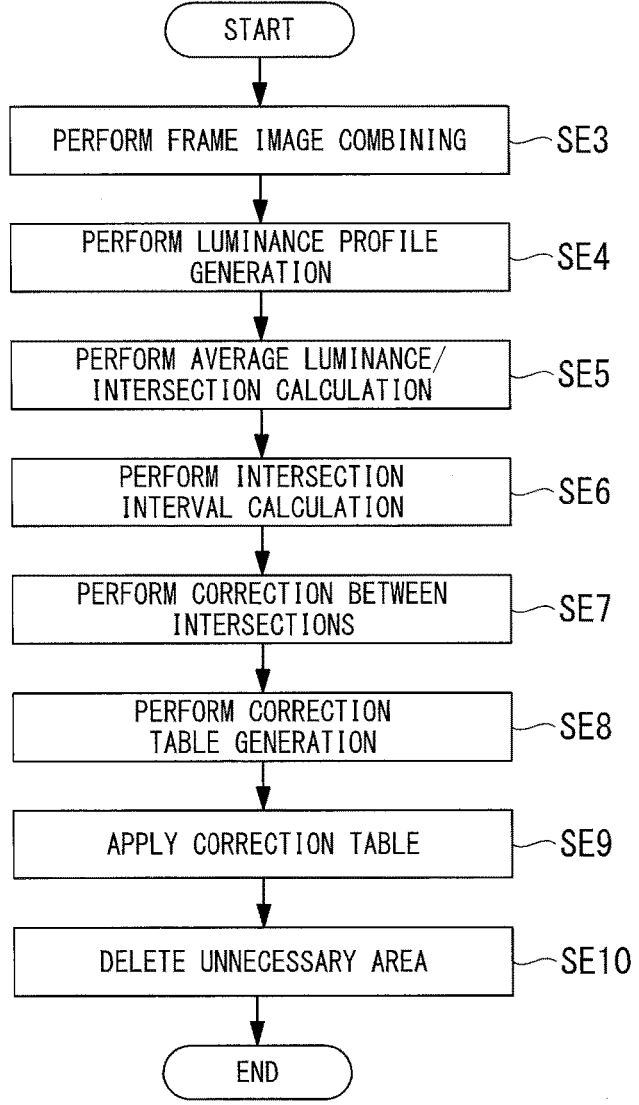
FIG. 40 is a flowchart illustrating a flow of an operation of the photography software in the second embodiment of the present invention.

FIG. 40 illustrates a flow of stage image generation in step SE. In step SE3, the CPU 52c generates a pile image by arranging and combining all frame images captured and recorded in the same stage in the vertical direction (a direction in which a plurality of blade are arranged) in time-series order. In step SE4, the CPU 52c generates a luminance profile including luminance of pixels on a line set at a predetermined position in the pile image corresponding to the stage Stg1.

Figure 41:
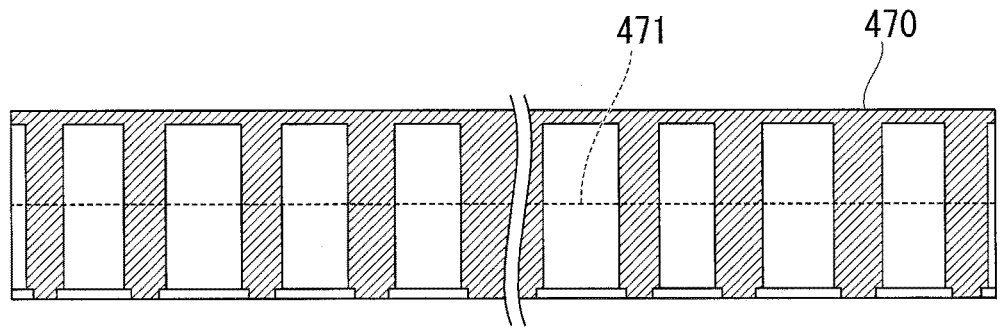
FIG. 41 is a diagram illustrating a pile image in the second embodiment of the present invention.

FIG. 41 illustrates the pile image. In FIG. 41, the pile image 470 combined in the vertical direction is illustrated in a state in which it is rotated 90 deg. Because rotational irregularity occurs in the rotation of the rotary shaft 18, a blade width and interval shown in the pile image 470 are not constant. In the pile image 470, a line 471 extending in a direction in which a plurality of blades are arranged (a direction across a plurality of blades) represents a luminance acquisition position. Although the line 471 is set at a predetermined position in the pile image 470 in this embodiment, the user may designate the position of the line 471.

Figure 42A:
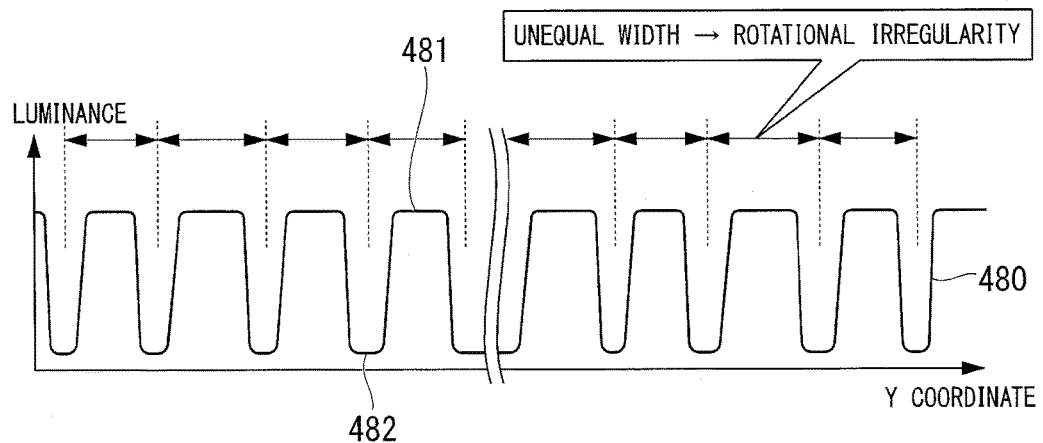
FIG. 42A is a graph of a luminance profile in the second embodiment of the present invention.

FIG. 42A illustrates a graph of a luminance profile including luminance of a pixel on the line 471. The horizontal axis represents a Y coordinate of the pixel on the line 471 in the pile image 470 (a horizontal coordinate of FIG. 41) and the vertical axis represents luminance of an image. Even in the graph of the luminance profile shown thereafter, the horizontal axis represents the Y coordinate and the vertical axis represents the image luminance. Information about the luminance profile is internally held, and the luminance profile is not displayed. The luminance profile represents variation in luminance in the line 471. In a luminance profile 480, a "peak" area 481 of high luminance and a "bottom" area 482 of low luminance are alternately shown. The "peak" area 481 is a blade area and the "bottom" area 482 is a background area. It can be seen that a width of each "peak" is different and rotational irregularity occurs.

Figure 42B:
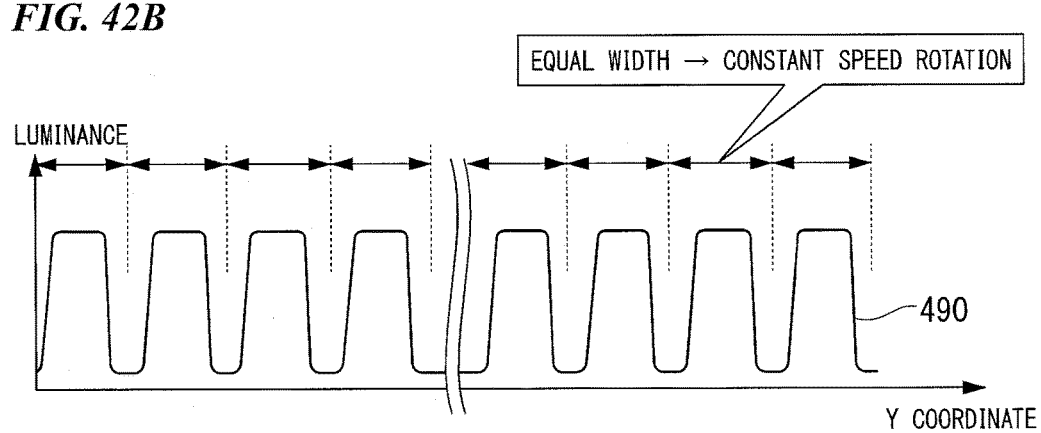
FIG. 42B is a graph of the luminance profile in the second embodiment of the present invention.

FIG. 42B illustrates a graph of a luminance profile when the rotary shaft 18 rotates at a constant speed. In the luminance profile 490, widths of the "peaks" are equal.

Figure 42C:
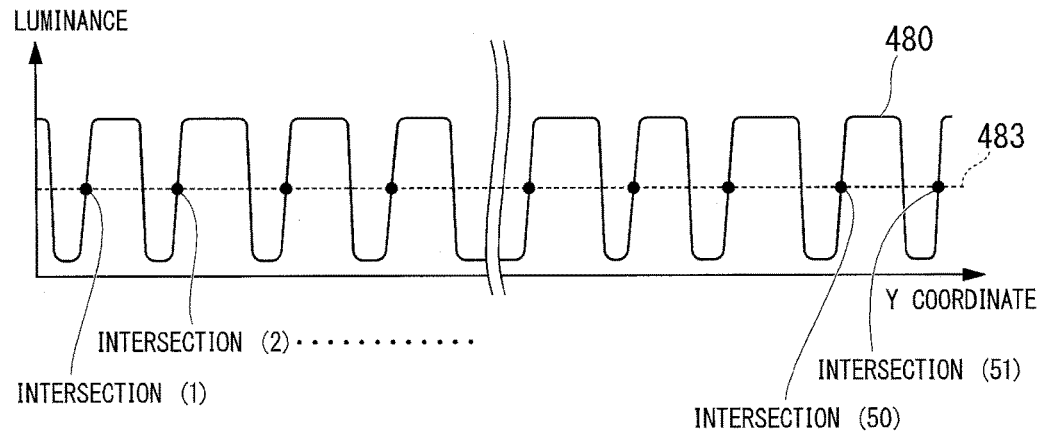
FIG. 42C is a graph of the luminance profile in the second embodiment of the present invention.

In step SE5, the CPU 52c calculates average luminance and intersections of the luminance profile. The average luminance is an average value of the overall luminance of the luminance profile. In FIG. 42C, average luminance 483 is represented on the luminance profile 480. The intersection is an intersection positioned on the left of one "peak" (a side of a smaller Y coordinate) among intersections between the luminance profile and a straight line plotting the average luminance. For example, when the number of "peaks" is 50 in FIG. 42C, 51 intersections are calculated. Continuous "peaks" for the number of blades input to the "number-of-blades" box 236 are selected and intersections corresponding to the selected "peaks" are calculated.

Figure 43A:
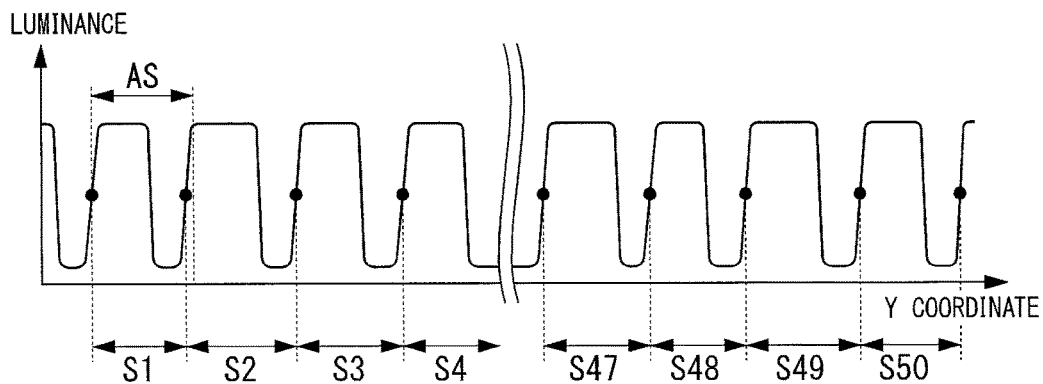
FIG. 43A is a graph of the luminance profile in the second embodiment of the present invention.

In step SE6, the CPU 52c calculates an interval between adjacent intersections. As illustrated in FIG. 43A, when there are 50 "peaks," 50 intersection intervals S1 to S50 are calculated. Then, an average of all the intersection intervals is calculated as an average interval AS. The intersection interval may be the same as a blade interval of the vertical direction in the pile image 470 (the horizontal direction of FIG. 41).

Figure 43B:
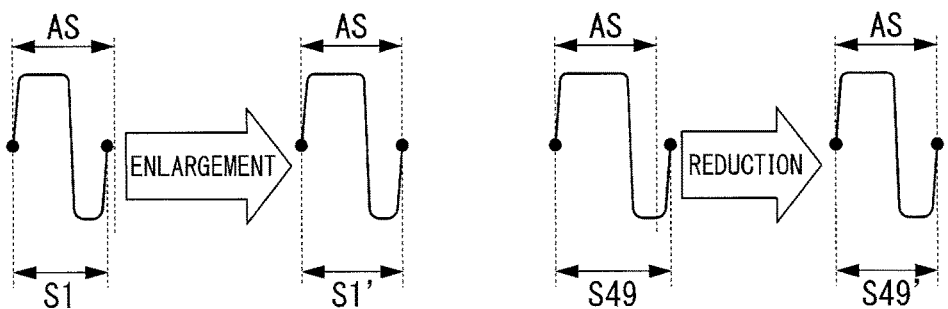
FIG. 43B is a diagram illustrating correction between intersections in the second embodiment of the present invention.

In step SE7, the CPU 52c performs correction between intersections. FIG. 43B illustrates content of the correction between the intersections. The correction between the intersections is a process of enlarging or reducing a luminance profile between adjacent intersections so that the intersection interval is consistent with the average interval. For example, because the intersection interval S1 is smaller than the average interval AS, the luminance profile between the intersections is enlarged in a Y coordinate direction. In addition, because the intersection interval S49 is larger than the average interval AS, the luminance profile between the intersections is reduced in the Y coordinate direction. In the correction between the intersections, the correction by the enlargement/reduction of the luminance profile is individually performed for each of the intersection intervals S1 to S50. After the correction, luminance profiles are rearranged in the Y coordinate direction.

Figure 43C:
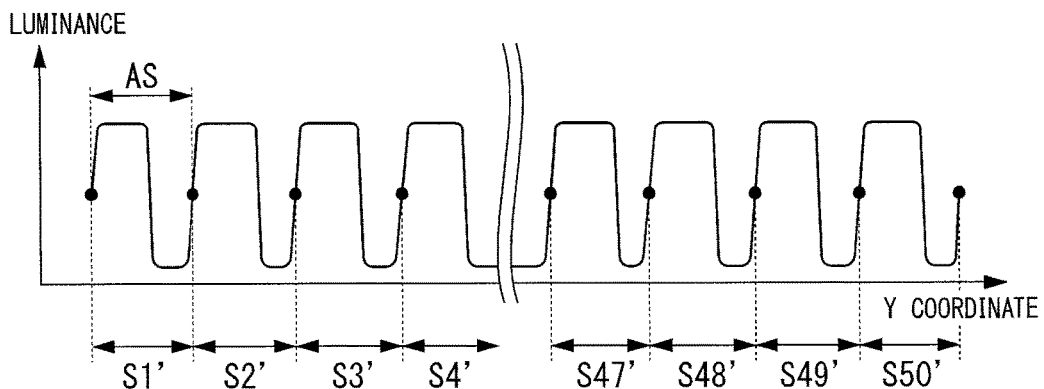
FIG. 43C is a graph of the luminance profile in the second embodiment of the present invention.

FIG. 43C illustrates the luminance profile after the correction between intersections. All intersection intervals S1' to S50' after the correction are equal to the average interval AS.

In step SE8, the CPU 52c generates a correction table. The correction table is a table in which information representing a Y coordinate to which the Y coordinate before the correction moves after the correction is held in the correction between the intersections in step SE7. Specifically, the correction table is a table in which information representing a Y coordinate to which the original Y coordinate moves after enlargement or reduction is held when the luminance profile is enlarged or reduced for each of the intersection intervals S1 to S50.

Figure 44A:
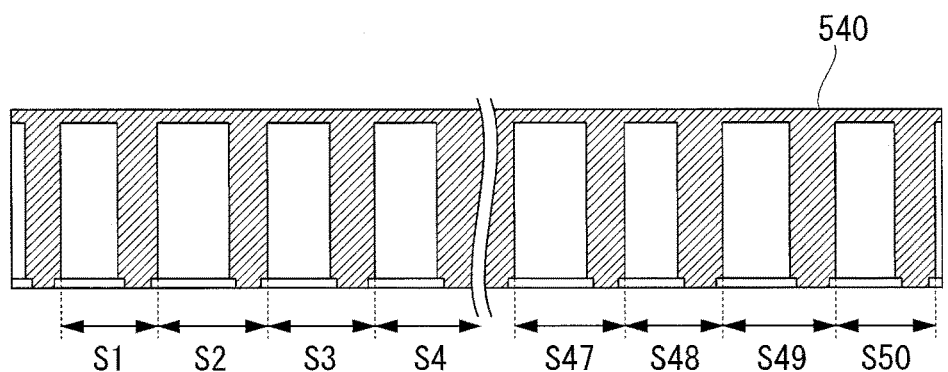
FIG. 44A is a diagram illustrating a pile image in the second embodiment of the present invention.
Figure 44B:
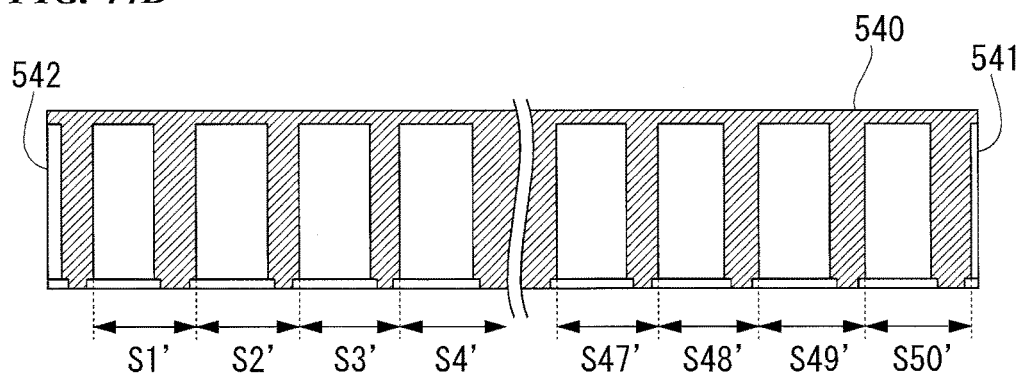
FIG. 44B is a diagram illustrating the pile image in the second embodiment of the present invention.

In step SE9, the CPU 52c applies the correction table to the pile image generated in step SE3 and moves the Y coordinate of the pixel, thereby correcting a blade width and position in the pile image. When the correction table is applied to a pile image 540 illustrated in FIG. 44A and the Y coordinate of the pixel moves, it can be seen that the blade intervals (intersection intervals S1 to S50) become equal intervals (intersection intervals S1' to S50') as illustrated in FIG. 44B.

Figure 44C:
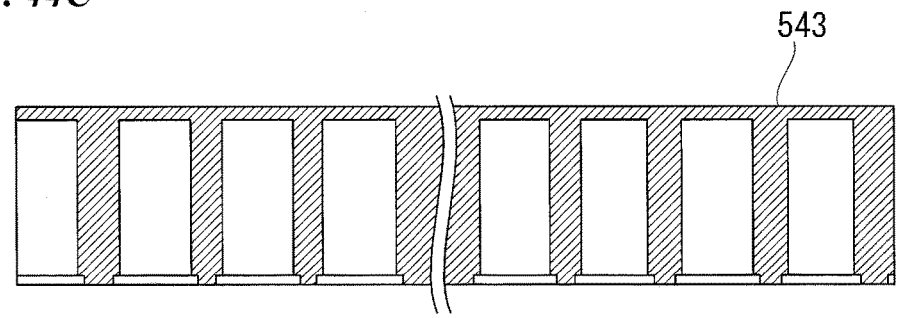
FIG. 44C is a diagram illustrating a stage image in the second embodiment of the present invention.

In step SE10, the CPU 52c deletes an unnecessary area from the pile image. The unnecessary area is an area other than the areas to which the correction table is applied (outside a range of the intersection intervals S1' to S50'). As illustrated in FIG. 44B, unnecessary areas 541 and 542 positioned at both ends of the pile image 540 are deleted. Thereby, an image including blades for one round is extracted from the pile image 540. As illustrated in FIG. 44C, an image 542 from which an unnecessary area is deleted is a stage image.

The same table as the correction table generated in step SE8 is also applied to pile images corresponding to the other stages Stg2 and Stg3 and the movement of the Y coordinate of the pixel is performed and therefore a blade width and position in the pile images are corrected. Further, from the pile images corresponding to the other stages Stg2 and Stg3, the same area as an area deleted as the unnecessary area in the pile image corresponding to the stage Stg1 is deleted. Because photography is performed simultaneously in the stages Stg1, Stg2, and Stg3, each pile image is an image captured in a state in which similar rotational irregularity has occurred. Thus, the correction table and the unnecessary area calculated from a certain pile image can be applied to all pile images.

Although a map image including a plurality of stage images is displayed in this embodiment, a stage image of each stage may be displayed without displaying a map image. In addition, although photography is performed simultaneously in a plurality of stages, only one borescope 30 may be inserted into the access port 21, photography may be performed in only one stage, and a stage image may be generated from an acquired frame image.

As described above, according to this embodiment, it is possible to generate an accurate stage image and map image even when rotational irregularity has occurred. In the stage image and the map image generated in this embodiment, blades for one round are accurately shown and a width and position of each blade become uniform.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A system for imaging an engine,
wherein the engine comprises:
a casing;
a rotary shaft arranged within the casing, and extending along a longitudinal axis;
a first plurality of blades arranged within the casing at a first point along the longitudinal axis of the rotary shaft, wherein the first plurality of blades are arranged around the rotary shaft and are configured to be rotated by the rotary shaft about the longitudinal axis; and
a second plurality of blades arranged within the casing at a second point along the longitudinal axis of the rotary shaft, wherein the second plurality of blades are arranged around the rotary shaft and are configured to be rotated by the rotary shaft about the longitudinal axis,
wherein the casing defines:
a first access port arranged to guide a first observation scope through the casing at a first radial direction to the longitudinal axis of the rotary shaft to acquire image information of the first plurality of blades as the rotary shaft makes a predetermined amount of rotation, wherein the first radial direction is radially offset from a reference radial direction to the longitudinal axis by a first predetermined degree; and
a second access port arranged to guide the first observation scope or a second observation scope through the casing at a second radial direction to the longitudinal axis of the rotary shaft to acquire image information of the second plurality of blades as the rotary shaft makes the predetermined amount of rotation, wherein the second radial direction is radially offset from the reference radial direction to the longitudinal axis by a second predetermined degree different from the first predetermined degree, and wherein the system comprises:
a processor comprising hardware, wherein the processor is configured to:
generate a first stage image of the first plurality of blades based on the image information of the first plurality of blades;
generate a second stage image of the second plurality of blades based on the image information of the second plurality of blades; and
align the first stage image to the second stage image based on the first predetermined degree of offset and the second predetermined degree of offset.

2. The system according to claim 1,
wherein the processor is configured to align the first stage image to the second stage image based on the first predetermined degree of offset and the second predetermined degree of offset such that:
the first stage image and the second stage image are arranged along a first axis; and
a portion of the first stage image corresponding to a predetermined position along a circumferential direction of the longitudinal axis of the rotary shaft is aligned, along a second axis perpendicular to the first axis, with a portion of the second stage image corresponding to the predetermined position along the circumferential direction of the longitudinal axis of the rotary shaft.

3. The system according to claim 2,
wherein the processor is configured to align the first stage image to the second stage image based on the first predetermined degree of offset and the second predetermined degree of offset by shifting the second stage image relative to the first stage image along the second axis.

4. The system according to claim 2,
wherein the processor is configured to align the first stage image to the second stage image based on the first predetermined degree of offset and the second predetermined degree of offset by performing on at least one of the first stage image and the second stage image:
clipping a portion the at least one of the first stage image and the second stage image including a first end of the at least one of the first stage image and the second stage image along the second axis; and
combining the portion to a second end of the at least one of the first stage image and the second stage image along the second axis.

5. A method for imaging an engine,
wherein the engine comprises:
a casing;
a rotary shaft arranged within the casing, and extending along a longitudinal axis;
a first plurality of blades arranged within the casing at a first point along the longitudinal axis of the rotary shaft, wherein the first plurality of blades are arranged around the rotary shaft and are configured to be rotated by the rotary shaft about the longitudinal axis; and
a second plurality of blades arranged within the casing at a second point along the longitudinal axis of the rotary shaft, wherein the second plurality of blades are arranged around the rotary shaft and are configured to be rotated by the rotary shaft about the longitudinal axis, wherein the casing defines:
a first access port arranged to guide a first observation scope through the casing at a first radial direction to the longitudinal axis of the rotary shaft to acquire image information of the first plurality of blades as the rotary shaft makes a predetermined amount of rotation, wherein the first radial direction is radially offset from a reference radial direction to the longitudinal axis by a first predetermined degree; and
a second access port arranged to guide the first observation scope or a second observation scope through the casing at a second radial direction to the longitudinal axis of the rotary shaft to acquire image information of the second plurality of blades as the rotary shaft makes the predetermined amount of rotation, wherein the second radial direction is radially offset from the reference radial direction to the longitudinal axis by a second predetermined degree different from the first predetermined degree, and wherein the method comprises:
generating a first stage image of the first plurality of blades based on the image information of the first plurality of blades;
generating a second stage image of the second plurality of blades based on the image information of the second plurality of blades; and
aligning the first stage image to the second stage image based on the first predetermined degree of offset and the second predetermined degree of offset.

6. The method according to claim 5,
wherein the first stage image is aligned to the second stage image based on the first predetermined degree of offset and the second predetermined degree of offset such that:
the first stage image and the second stage image are arranged along a first axis; and
a portion of the first stage image corresponding to a predetermined position along a circumferential direction of the longitudinal axis of the rotary shaft is aligned, along a second axis perpendicular to the first axis, with a portion of the second stage image corresponding to the predetermined position along the circumferential direction of the longitudinal axis of the rotary shaft.

7. The method according to claim 6,
wherein the first stage image is aligned to the second stage image based on the first predetermined degree of offset and the second predetermined degree of offset by shifting the second stage image relative to the first stage image along the second axis.

8. The method according to claim 6,
wherein the first stage image is aligned to the second stage image based on the first predetermined degree of offset and the second predetermined degree of offset, comprises:
clipping a portion the at least one of the first stage image and the second stage image including a first end of the at least one of the first stage image and the second stage image along the second axis; and combining the portion to a second end of the at least one of the first stage image and the second stage image along the second axis.

9. A non-transitory computer-readable storage device storing instructions for imaging an engine,
wherein the engine comprises:
a casing;
a rotary shaft arranged within the casing, and extending along a longitudinal axis;
a first plurality of blades arranged within the casing at a first point along the longitudinal axis of the rotary shaft, wherein the first plurality of blades are arranged around the rotary shaft and are configured to be rotated by the rotary shaft about the longitudinal axis; and
a second plurality of blades arranged within the casing at a second point along the longitudinal axis of the rotary shaft, wherein the second plurality of blades are arranged around the rotary shaft and are configured to be rotated by the rotary shaft about the longitudinal axis,
wherein the casing defines:
a first access port arranged to guide a first observation scope through the casing at a first radial direction to the longitudinal axis of the rotary shaft to acquire image information of the first plurality of blades as the rotary shaft makes a predetermined amount of rotation, wherein the first radial direction is radially offset from a reference radial direction to the longitudinal axis by a first predetermined degree; and
a second access port arranged to guide the first observation scope or a second observation scope through the casing at a second radial direction to the longitudinal axis of the rotary shaft to acquire image information of the second plurality of blades as the rotary shaft makes the predetermined amount of rotation, wherein the second radial direction is radially offset from the reference radial direction to the longitudinal axis by a second predetermined degree different from the first predetermined degree, and
wherein the instructions, when executed by a processor, cause the processor to perform:
generating a first stage image of the first plurality of blades based on the image information of the first plurality of blades;
generating a second stage image of the second plurality of blades based on the image information of the second plurality of blades; and
aligning the first stage image to the second stage image based on the first predetermined degree of offset and the second predetermined degree of offset.

* * * * *